(12) United States Patent
Chang et al.

(10) Patent No.: US 12,501,713 B2
(45) Date of Patent: Dec. 16, 2025

(54) REVISING IC LAYOUT DESIGN TO ELIMINATE GAPS BETWEEN ISOLATION STRUCTURES

(71) Applicant: Taiwan Semiconductor Manufacturing Company, Ltd., Hsinchu (TW)

(72) Inventors: Tun Jen Chang, Hsinchu (TW); Tung-Heng Hsieh, Hsinchu County (TW); Bao-Ru Young, Hsinchu County (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 726 days.

(21) Appl. No.: 17/407,669

(22) Filed: Aug. 20, 2021

(65) Prior Publication Data

US 2023/0056694 A1    Feb. 23, 2023

(51) Int. Cl.
*H10D 89/10*    (2025.01)
*G06F 30/398*    (2020.01)
(Continued)

(52) U.S. Cl.
CPC ........... *H10D 89/10* (2025.01); *G06F 30/398* (2020.01); *H10B 10/12* (2023.02);
(Continued)

(58) Field of Classification Search
CPC ............... H10B 10/12; H10D 84/0186; H10D 84/0193; H10D 84/853; H10D 89/10;
(Continued)

(56) References Cited

U.S. PATENT DOCUMENTS 8,421,205 B2    4/2013  Yang
8,661,389 B2    2/2014  Chern et al.
(Continued)

FOREIGN PATENT DOCUMENTS

CN    110164864 A    8/2019
TW    202036904 A    10/2020
(Continued)

OTHER PUBLICATIONS

Baker, R.J. (2010). Memory Circuits. In CMOS, R.J. Baker (Ed.), pp. 433-482. https://doi.org/10.1002/9780470891179.ch16 (Year: 2010).*

(Continued)

*Primary Examiner* — Marcos D. Pizarro
(74) *Attorney, Agent, or Firm* — HAYNES AND BOONE, LLP

(57) ABSTRACT

An integrated circuit (IC) layout design is received that includes a first circuit cell and a second circuit cell abutted to one another. The first circuit cell contains a first IC component, and the second circuit cell contains a second IC component. A determination is made that a distance between the first IC component and the second IC component is less than a predefined threshold when the first circuit cell and the second circuit cell are abutted together. The IC layout design is revised such that the distance between the first IC component and the second IC component is eliminated in the revised IC layout design.

20 Claims, 18 Drawing Sheets

(51) Int. Cl.
  *H10B 10/00* (2023.01)
  *H10D 84/01* (2025.01)
  *H10D 84/03* (2025.01)
  *H10D 84/85* (2025.01)

(52) U.S. Cl.
  CPC ..... *H10D 84/0149* (2025.01); *H10D 84/0186* (2025.01); *H10D 84/0193* (2025.01); *H10D 84/038* (2025.01); *H10D 84/853* (2025.01)

(58) Field of Classification Search
  CPC ......... H01L 27/0207; H01L 21/823475; H01L 21/823431; H01L 27/0886; H01L 21/823481; H01L 27/088; G06F 30/398; G06F 2117/12; G06F 2111/20; G06F 2119/18
  See application file for complete search history.

(56) References Cited

U.S. PATENT DOCUMENTS

| | | | |
|---|---|---|---|
| 8,698,205 | B2 | 4/2014 | Tzeng et al. |
| 8,826,212 | B2 | 9/2014 | Yeh et al. |
| 8,836,141 | B2 | 9/2014 | Chi et al. |
| 2010/0207213 | A1* | 8/2010 | Tan ........................ H01L 21/743 438/151 |
| 2014/0215420 | A1 | 7/2014 | Lin et al. |
| 2014/0264924 | A1 | 9/2014 | Yu et al. |
| 2014/0282289 | A1 | 9/2014 | Hsu et al. |
| 2014/0325466 | A1 | 10/2014 | Ke et al. |
| 2020/0075489 | A1* | 3/2020 | Liebmann ............. H01L 23/535 |
| 2021/0104463 | A1* | 4/2021 | Lee ..................... H01L 23/5283 |
| 2021/0151426 | A1 | 5/2021 | Chae |
| 2021/0193666 | A1* | 6/2021 | Gomes ................. H10B 12/482 |
| 2022/0157853 | A1* | 5/2022 | Cho ................. H01L 21/823871 |

FOREIGN PATENT DOCUMENTS

| TW | 202115914 A | 4/2021 |
|---|---|---|
| TW | 202123059 A | 6/2021 |

OTHER PUBLICATIONS

Carns, T.K., Zheng, X. and Wang, K.L. (1999). Sram Chips. In Wiley Encyclopedia of Electrical and Electronics Engineering, J.G. Webster (Ed.) https://doi.org/10.1002/047134608X.W6829, p. 322 (Year: 1999).*

* cited by examiner

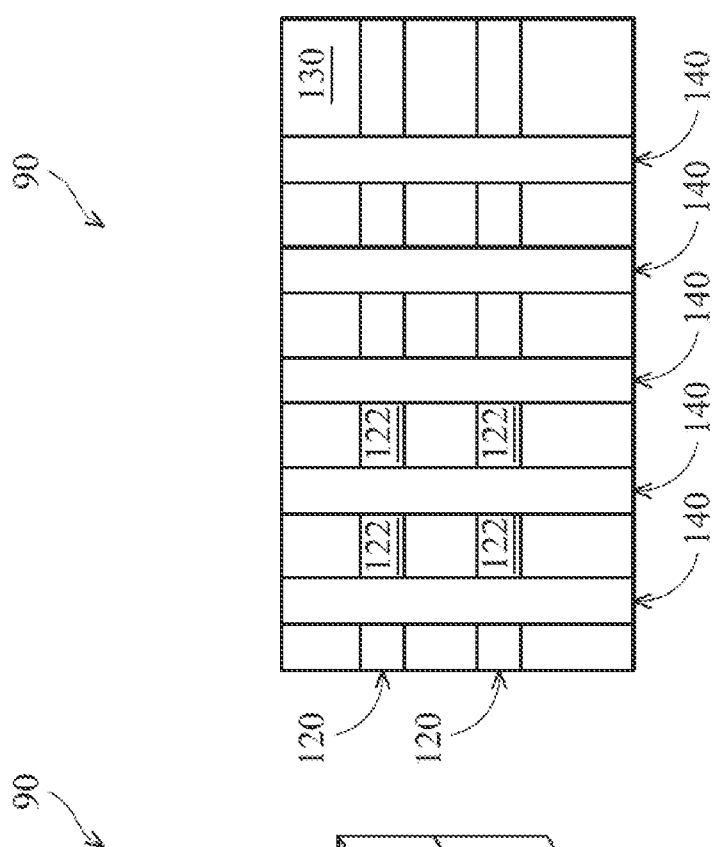
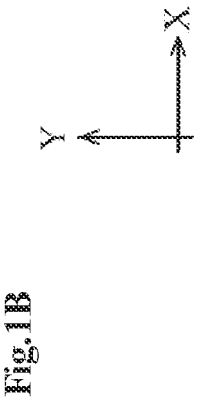
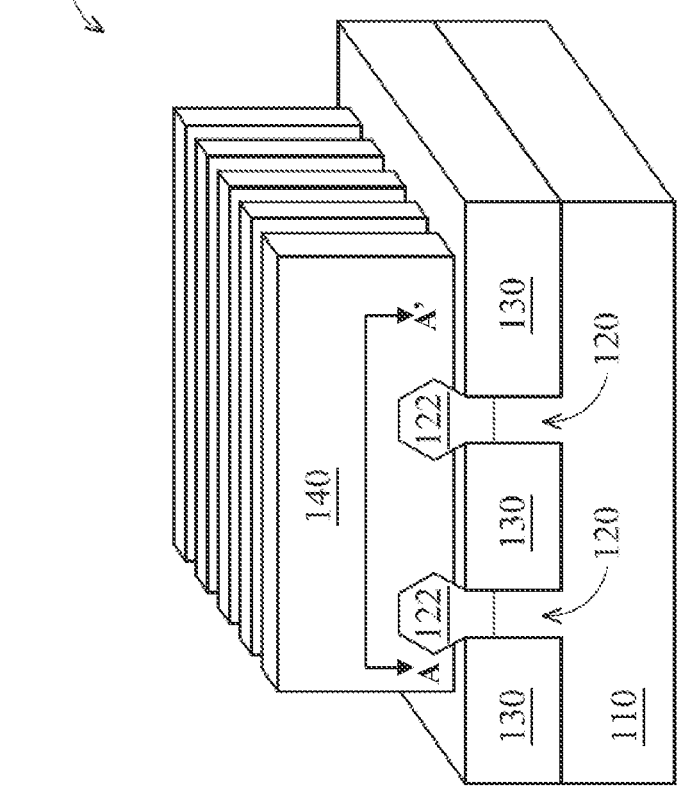
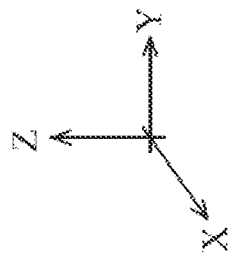
Fig. 1A
Fig. 1B

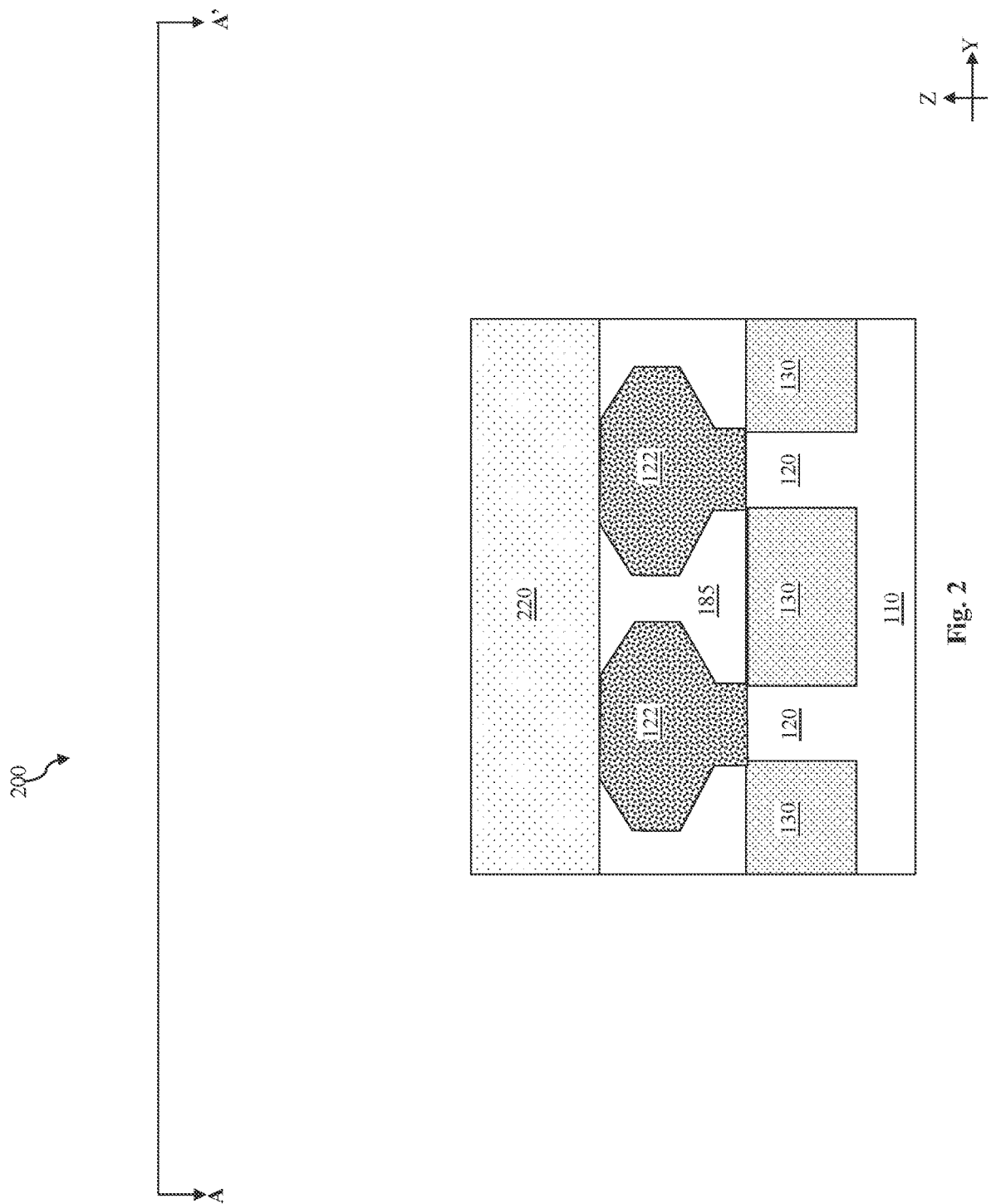

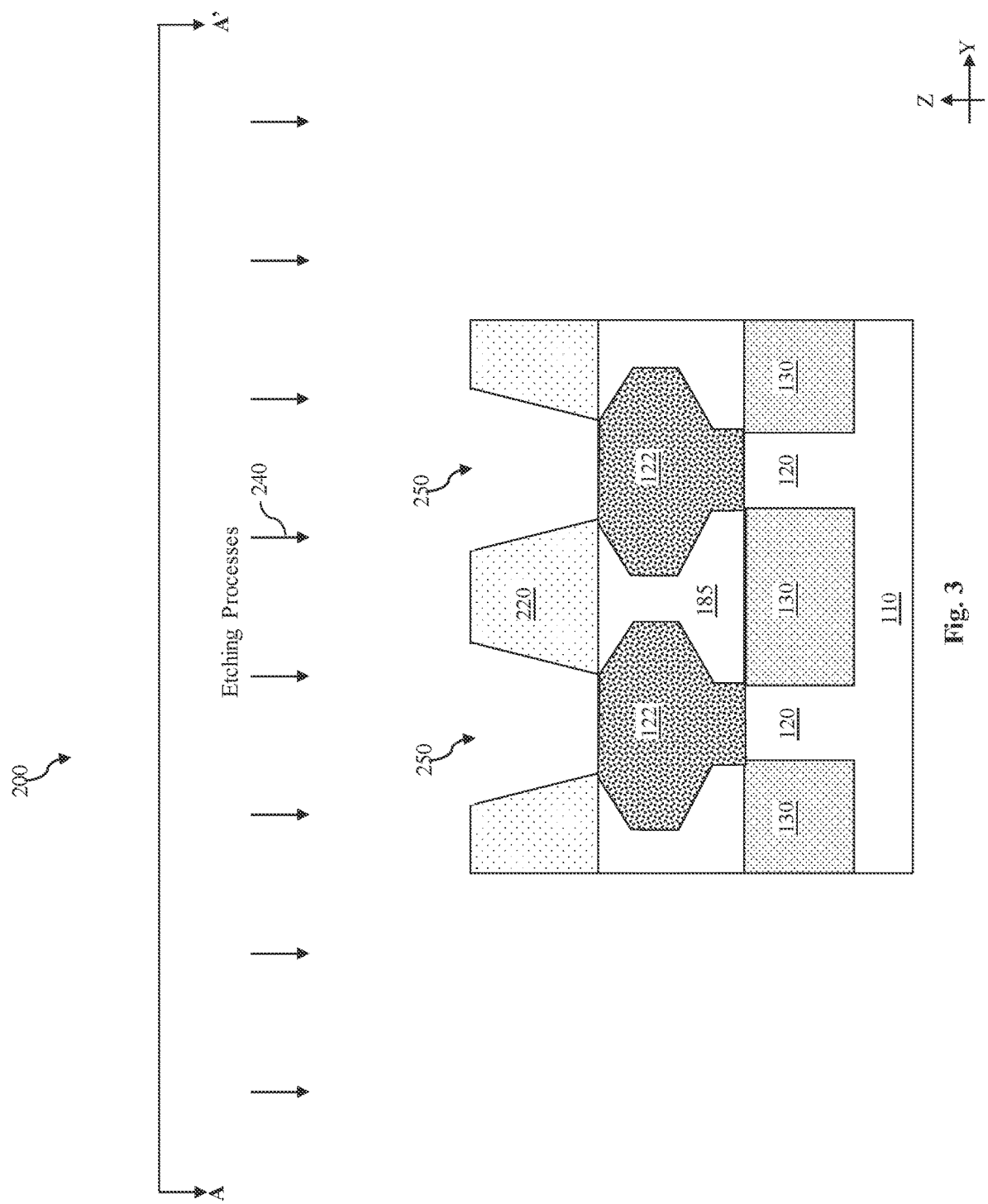

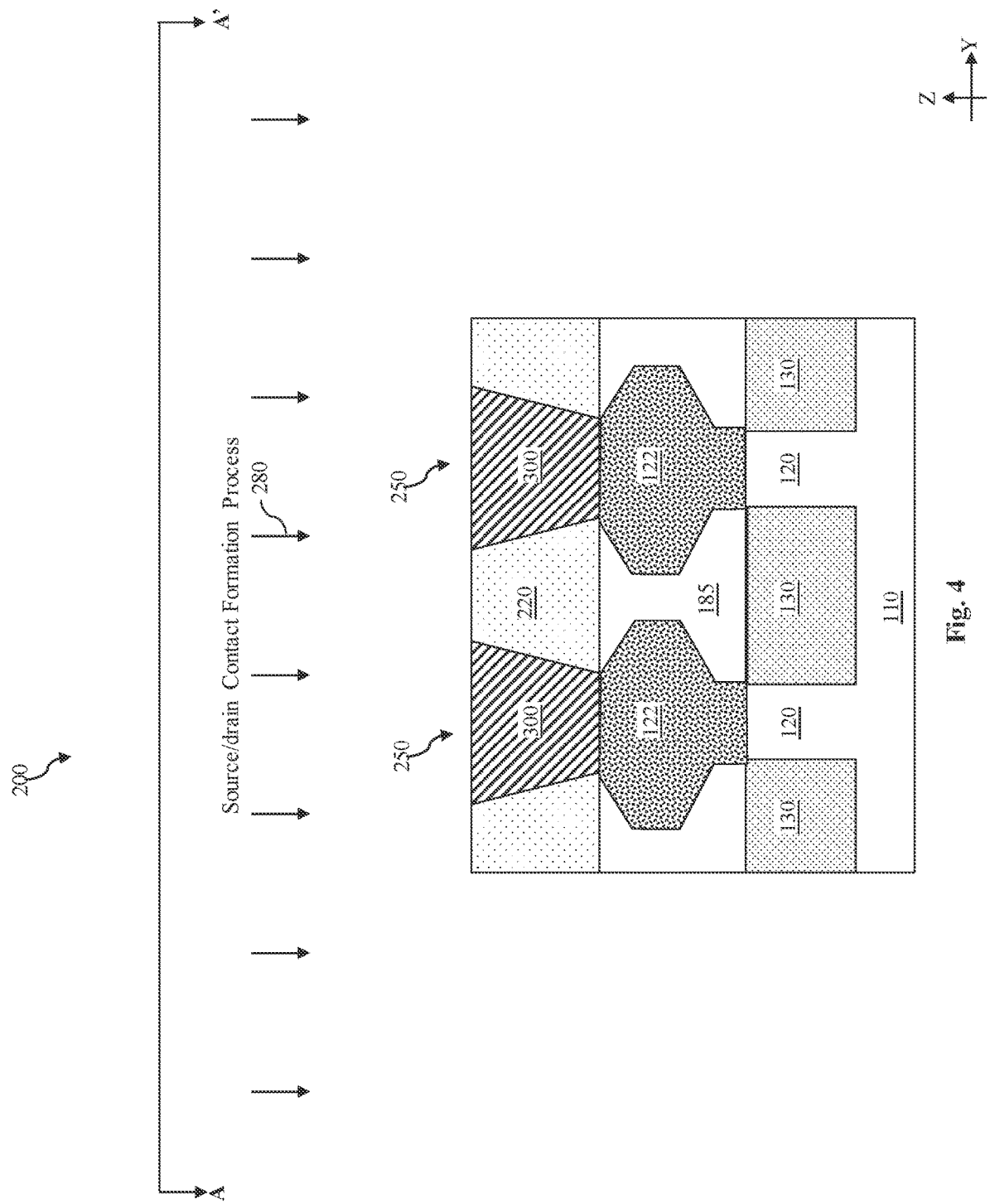

REVISING IC LAYOUT DESIGN TO ELIMINATE GAPS BETWEEN ISOLATION STRUCTURES

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs.

For example, as semiconductor devices continue to get scaled down, it may become difficult for existing lithography processes to adequately resolve features that are located close together. Such a situation may arise when two circuit cells are abutted to one another. When this occurs, certain types of IC components from one circuit cell may be located too close to IC components from an abutting circuit cell according to their original IC layout design. As such, the actually manufactured IC may have defects or suffer from performance degradations.

Therefore, although conventional methods of fabricating semiconductor devices have generally been adequate, they have not been satisfactory in all aspects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIG. 1A is a perspective view of an IC device in the form of a FinFET according to various aspects of the present disclosure.

FIG. 1B is a planar top view of an IC device in the form of a FinFET according to various aspects of the present disclosure.

FIGS. 2-5 are cross-sectional side views of an IC device at various stages of fabrication according to various aspects of the present disclosure.

DETAILED DESCRIPTION

Figure 1C:
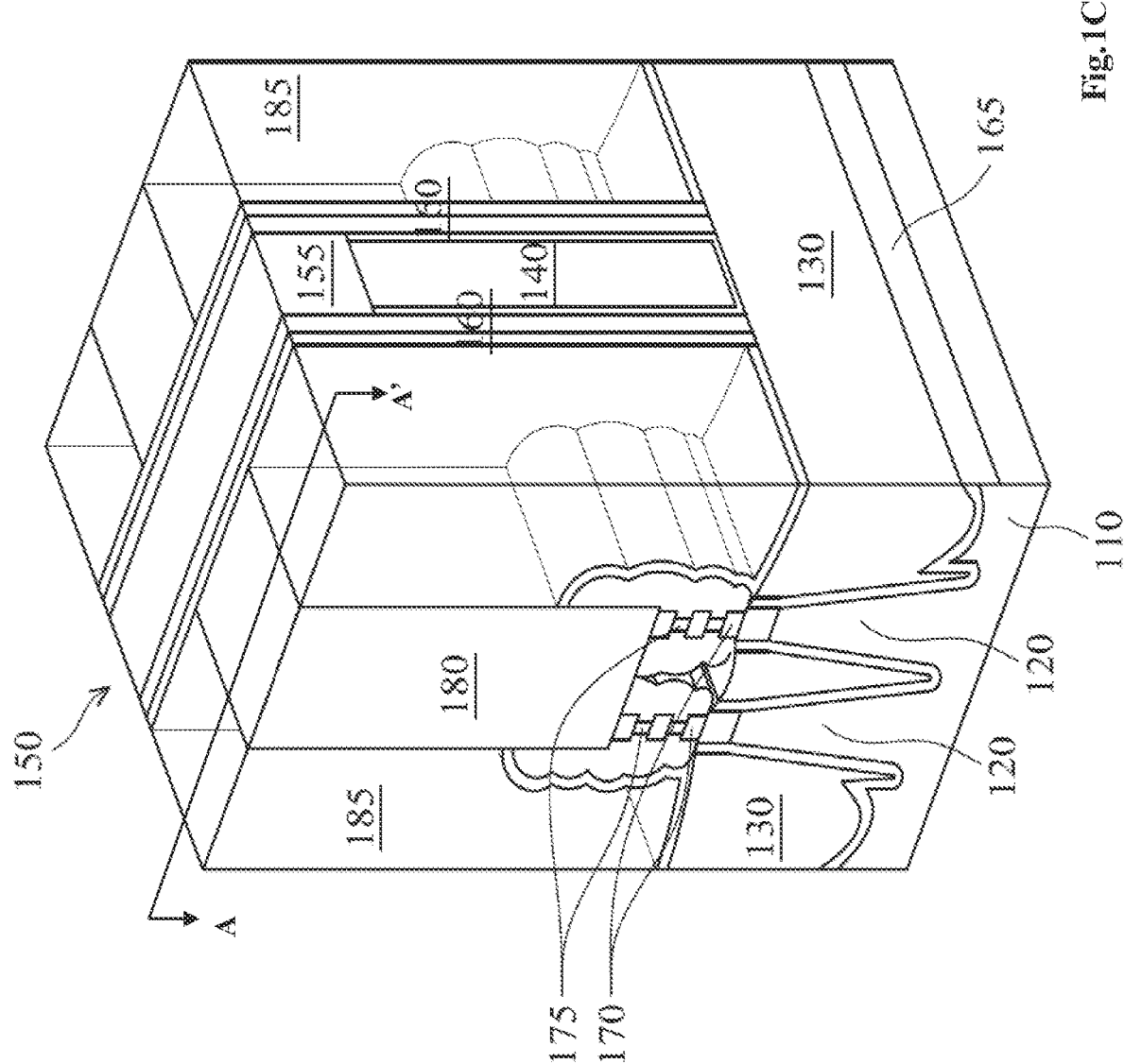
FIG. 1C is a perspective view of an IC device in the form of a GAA device according to various aspects of the present disclosure.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc., as well as derivatives thereof (e.g., "horizontally," "downwardly," "upwardly," etc.) are used for ease of the present disclosure of one features relationship to another feature. The spatially relative terms are intended to cover different orientations of the device including the features. Still further, when a number or a range of numbers is described with "about," "approximate," and the like, the term is intended to encompass numbers that are within a reasonable range including the number described, such as within +/−10% of the number described or other values as understood by person skilled in the art. For example, the term "about 5 nm" encompasses the dimension range from 4.5 nm to 5.5 nm.

The present disclosure is generally related to semiconductor devices, and more particularly to field-effect transistors (FETs), such as planar FETs, three-dimensional fin-line FETs (FinFETs), or gate-all-around (GAA) devices. One aspect of the present disclosure involves forming isolation structures to electrically isolate the epitaxially grown source/drain components from adjacent transistors. As a result, device yield, reliability, and/or performance may be improved, as discussed below in more detail.

As semiconductor device sizes continue to get scaled down, the small spacing between certain IC components may give rise to problems. For example, in a given IC layout design, when a first circuit cell and a second circuit cell are abutted right next to each other, the distance separating an IC component (e.g., a segment from an isolation layer for source/drain contacts) from the first circuit cells and another IC component from the second circuit cell may be too small, such that the accurate resolution of these two IC components may be difficult. As a result, IC devices fabricated according to such an IC layout design may have defects. To overcome these problems, the present disclosure revises the IC layout design, for example by resizing (e.g., enlarging) the IC components of these circuit cells or by implementing patches between these IC components, in order to eliminate the small spacing between these IC components from abutted circuit cells, as will be discussed below in more detail with reference to FIGS. 1A-1C and 2-17.

FIGS. 1A and 1B illustrate a three-dimensional perspective view and a top view, respectively, of a portion of an Integrated Circuit (IC) device 90. The IC device 90 may be an intermediate device fabricated during processing of an IC, or a portion thereof, that may comprise static random-access memory (SRAM) and/or other logic circuits, passive components such as resistors, capacitors, and inductors, and active components such as p-type FETs (PFETs), n-type FETs (NFETs), FinFETs, metal-oxide semiconductor field effect transistors (MOSFET), complementary metal-oxide semiconductor (CMOS) transistors, bipolar transistors, high voltage transistors, high frequency transistors, and/or other memory cells. The present disclosure is not limited to any particular number of devices or device regions, or to any particular device configurations, unless otherwise claimed. For example, although the IC device 90 as illustrated is a three-dimensional FinFET device, the concepts of the present disclosure may also apply to planar FET devices or GAA devices.

Referring to FIG. 1A, the IC device 90 includes a substrate 110. The substrate 110 may comprise an elementary (single element) semiconductor, such as silicon, germanium, and/or other suitable materials; a compound semiconductor, such as silicon carbide, gallium arsenic, gallium phosphide, indium phosphide, indium arsenide, indium antimonide, and/or other suitable materials; an alloy semiconductor such as SiGe, GaAsP, AlInAs, AlGaAs, GaInAs, GaInP, GaInAsP, and/or other suitable materials. The substrate 110 may be a single-layer material having a uniform composition. Alternatively, the substrate 110 may include multiple material layers having similar or different compositions suitable for IC device manufacturing. In one example, the substrate 110 may be a silicon-on-insulator (SOI) substrate having a semiconductor silicon layer formed on a silicon oxide layer. In another example, the substrate 110 may include a conductive layer, a semiconductor layer, a dielectric layer, other layers, or combinations thereof. Various doped regions, such as source/drain regions, may be formed in or on the substrate 110. The doped regions may be doped with n-type dopants, such as phosphorus or arsenic, and/or p-type dopants, such as boron, depending on design requirements. The doped regions may be formed directly on the substrate 110, in a p-well structure, in an n-well structure, in a dual-well structure, or using a raised structure. Doped regions may be formed by implantation of dopant atoms, in-situ doped epitaxial growth, and/or other suitable techniques.

Three-dimensional active regions 120 are formed on the substrate 110. The active regions 120 are elongated fin-like structures that protrude upwardly out of the substrate 110. As such, the active regions 120 may be interchangeably referred to as fin structures 120 or fin structures 120 hereinafter. The fin structures 120 may be fabricated using suitable processes including photolithography and etch processes. The photolithography process may include forming a photoresist layer overlying the substrate 110, exposing the photoresist to a pattern, performing post-exposure bake processes, and developing the photoresist to form a masking element (not shown) including the resist. The masking element is then used for etching recesses into the substrate 110, leaving the fin structures 120 on the substrate 110. The etching process may include dry etching, wet etching, reactive ion etching (RIE), and/or other suitable processes. In some embodiments, the fin structure 120 may be formed by double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. As an example, a layer may be formed over a substrate and patterned using a photolithography process. Spacers are formed alongside the patterned layer using a self-aligned process. The layer is then removed, and the remaining spacers, or mandrels, may then be used to pattern the fin structures 120.

The IC device 90 also includes source/drain features 122 formed over the fin structures 120. The source/drain features 122 may include epi-layers that are epitaxially grown on the fin structures 120. The IC device 90 further includes isolation structures 130 formed over the substrate 110. The isolation structures 130 electrically separate various components of the IC device 90. The isolation structures 130 may include silicon oxide, silicon nitride, silicon oxynitride, fluoride-doped silicate glass (FSG), a low-k dielectric material, and/or other suitable materials. In some embodiments, the isolation structures 130 may include shallow trench isolation (STI) features. In one embodiment, the isolation structures 130 are formed by etching trenches in the substrate 110 during the formation of the fin structures 120. The trenches may then be filled with an isolating material described above, followed by a chemical mechanical planarization (CMP) process. Other isolation structure such as field oxide, local oxidation of silicon (LOCOS), and/or other suitable structures may also be implemented as the isolation structures 130. Alternatively, the isolation structures 130 may include a multi-layer structure, for example, having one or more thermal oxide liner layers.

The IC device 90 also includes gate structures 140 formed over and engaging the fin structures 120 on three sides in a channel region of each fin 120. The gate structures 140 may be dummy gate structures (e.g., containing an oxide gate dielectric and a polysilicon gate electrode), or they may be HKMG structures that contain a high-k gate dielectric and a metal gate electrode, where the HKMG structures are formed by replacing the dummy gate structures. In some embodiments, the HKMG structures may each include a high-k gate dielectric and a metal gate electrode. Example materials of the high-gate k dielectric include hafnium oxide, zirconium oxide, aluminum oxide, hafnium dioxide-alumina alloy, hafnium silicon oxide, hafnium silicon oxynitride, hafnium tantalum oxide, hafnium titanium oxide, hafnium zirconium oxide, or combinations thereof. The metal gate electrode may include one or more work function metal layers and one or more fill metal layers. The work function metal layers may be configured to tune a work function of the respective transistor. Example materials for the work function metal layers may include titanium nitride (TiN), Titanium aluminide (TiAl), tantalum nitride (TaN), titanium carbide (Tic), tantalum carbide (TaC), tungsten carbide (WC), titanium aluminum nitride (TiAlN), zirconium aluminide (ZrAl), tungsten aluminide (WAl), tantalum aluminide (TaAl), hafnium aluminide (HfAl), or combinations thereof. The fill metal layer may serve as a main conductive portion of the gate electrode layer. Though not depicted herein, the gate structure 140 may include additional material layers, such as an interfacial layer over the fin structures 120, a capping layer, other suitable layers, or combinations thereof.

Referring to FIG. 1B, multiple fin structures 120 are oriented lengthwise along the X-direction, and multiple gate structure 140 are oriented lengthwise along the Y-direction, i.e., generally perpendicular to the fin structures 120. In many embodiments, the IC device 90 includes additional features such as gate spacers disposed along sidewalls of the gate structures 140, hard mask layer(s) disposed over the gate structures 140, and numerous other features.

It is also understood that the various aspects of the present disclosure discussed below may apply to multi-channel devices such as Gate-All-Around (GAA) devices. FIG. 1C illustrates a three-dimensional perspective view of an example GAA device 150. For reasons of consistency and clarity, similar components in FIG. 1C and FIGS. 1A-1B will be labeled the same. For example, active regions such as fin structures 120 rise vertically upwards out of the substrate 110 in the Z-direction. The isolation structures 130 provide electrical separation between the fin structures 120. The gate structure 140 is located over the fin structures 120 and over the isolation structures 130. A mask 155 is located over the gate structure 140, and gate spacers 160 are located on sidewalls of the gate structure 140. A capping layer 165 is formed over the fin structures 120 to protect the fin structures 120 from oxidation during the forming of the isolation structures 130.

A plurality of nano-structures 170 are disposed over each of the fin structures 120. The nano-structures 170 may include nano-sheets, nano-tubes, or nano-wires, or some other type of nano-structure that extends horizontally in the X-direction. Portions of the nano-structures 170 under the gate structure 140 may serve as the channels of the GAA device 150. Dielectric inner spacers 175 may be disposed between the nano-structures 170. In addition, although not illustrated for reasons of simplicity, each of the nano-structures 170 may be wrapped around circumferentially by a gate dielectric as well as a gate electrode. In the illustrated embodiment, the portions of the nano-structures 170 outside the gate structure 140 may serve as the source/drain features of the GAA device 150. However, in some embodiments, continuous source/drain features may be epitaxially grown over portions of the fin structures 120 outside of the gate structure 140. Regardless, conductive source/drain contacts 180 may be formed over the source/drain features to provide electrical connectivity thereto. An interlayer dielectric (ILD) 185 is formed over the isolation structures 130 and around the gate structure 140 and the source/drain contacts 180.

Additional details pertaining to the fabrication of GAA devices are disclosed in U.S. Pat. No. 10,164,012, titled "Semiconductor Device and Manufacturing Method Thereof" and issued on Dec. 25, 2018, as well as in U.S. Pat. No. 10,361,278, titled "Method of Manufacturing a Semiconductor Device and a Semiconductor Device" and issued on Jul. 23, 2019, and also in U.S. Pat. No. 9,887,269, titled "Multi-Gate Device and Method of Fabrication Thereof" and issued on Feb. 6, 2018, the disclosures of each which are hereby incorporated by reference in their respective entireties. To the extent that the present disclosure refers to a fin structure or FinFET devices, such discussions may apply equally to the GAA devices.

FIGS. 2-5 are a series of cross-sectional drawings of an IC device 200 at various stages of fabrication, to illustrate how source/drain contacts may be formed according to various aspects of the present disclosure. The cross-sectional cuts in FIGS. 2-5 are taken along an Y-direction, for example along the cutline A-A' in FIG. 1A (in the case of a FinFET) or FIG. 1C (in the case of a GAA device). As such, FIGS. 2-5 may be referred to as Y-cut Figures. For reasons of consistency and clarity, similar components appearing in FIGS. 1A-1C and 2-5 will be labeled the same.

Referring to FIG. 2, the IC device 200 includes the substrate 110 discussed above with reference to FIGS. 1A-1C, for example a silicon substrate. The substrate includes a plurality of active regions, for example the fin structures 120 discussed above with reference to FIGS. 1A-1B. The fin structures 120 each extends laterally in the X-direction, and they are separated from one another in the Y-direction by the isolation structures 130 discussed above.

An epitaxial growth process may be performed to the IC device 200 to epitaxially grow source/drain components 122 of the FinFET transistors. The source/drain components 122 are grown on/over the fin structures 120 and may belong to different transistors. For example, in some embodiments, one of the source/drain components 122 may belong to an NFET, while the other one of the source/drain components 122 may belong to a PFET.

The source/drain components 122 are surrounded (or separated from one another) by the ILD 185, which is also referred to as an ILD0 layer herein. In some embodiments, the ILD 185 may include a low-k dielectric (e.g., a dielectric material having a dielectric constant less than that of silicon oxide, which is about 3.9). In other embodiments, the ILD 185 may include silicon oxide, silicon nitride, silicon carbide, or combinations thereof. The portions of the ILD 185 disposed between the source/drain components 122 provide physical and electrical isolation between them.

An isolation layer 220 is formed over the ILD 185 and over the source/drain components 122. In some embodiments, the isolation layer 220 may contain silicon. In other embodiments, the isolation layer 220 may contain a dielectric material, such as silicon oxide, silicon nitride, silicon oxynitride, silicon carbide, etc.

Referring now to FIG. 3, one or more etching processes 240 may be performed to the IC device 200 to form source/drain contact trenches 250. The one or more etching processes 240 may include wet etching processes, dry etching processes, or combinations thereof. The source/drain contact trenches 250 each extend vertically (in the Z-direction) through the isolation layer 220 and at least partially expose the upper surfaces of the source/drain components 122.

Referring now to FIG. 4, a source/drain contact formation process 280 may be performed to the IC device 200 to form source/drain contacts 300 in the source/drain contact trenches 250. For example, the source/drain contact formation process 280 may include one or more deposition processes to deposit a conductive material such as tungsten, titanium, cobalt, aluminum, copper, or combinations, into the source/drain contact trenches 250. Thereafter, a polishing process such as a CMP process may be performed to remove portions of the deposited conductive material outside of the source/drain contact trenches 250 (e.g., portions disposed over the upper surface of the isolation layer 220), until the upper surfaces of the source/drain contacts 300 are substantially co-planar with the upper surfaces of the isolation layer 220. The source/drain contacts 300 are each electrically coupled to their respective source/drain component 122 therebelow and provide electrical connectivity thereto.

Figure 5:
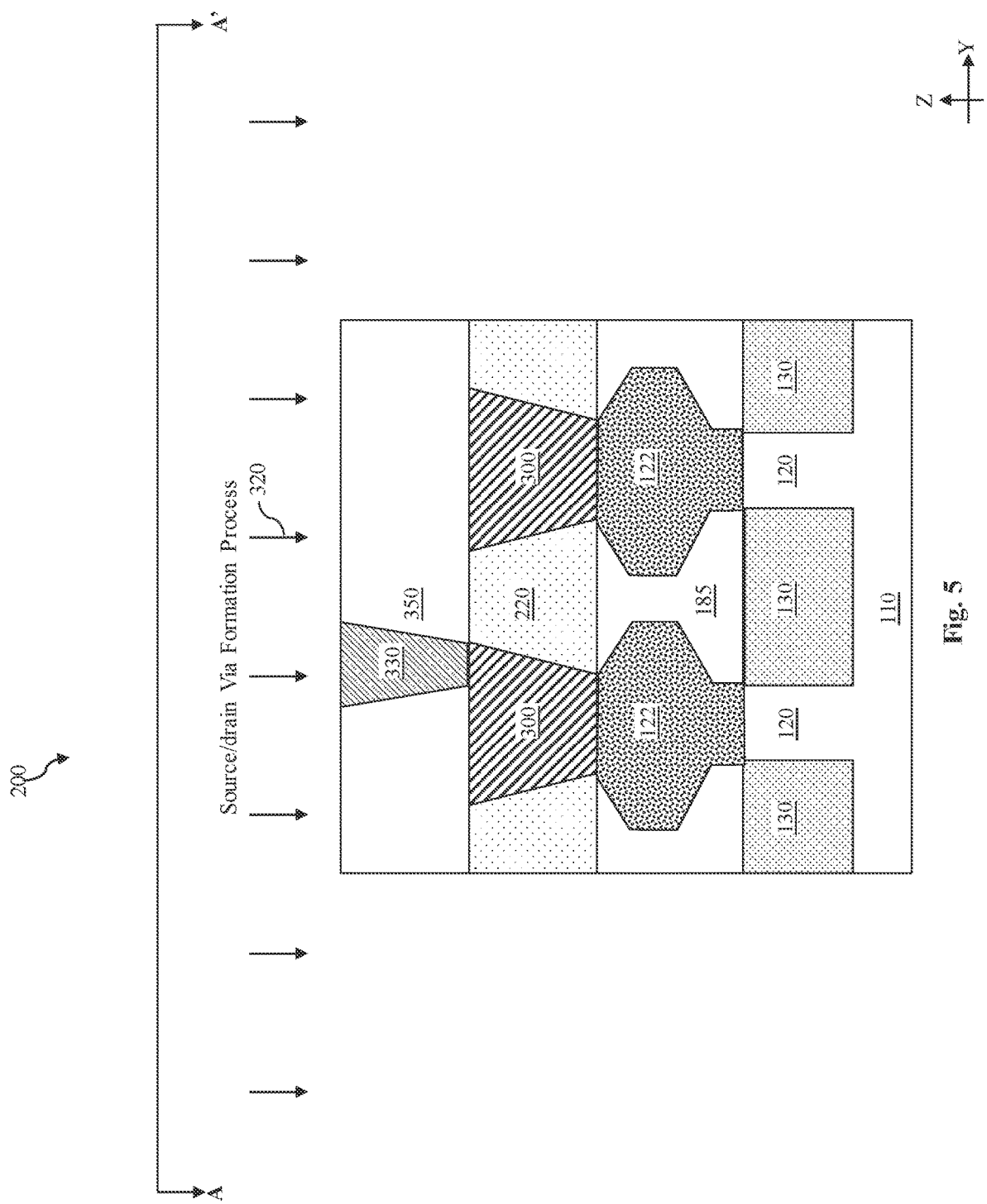

Referring now to FIG. 5, a source/drain via formation process 320 may be performed to the IC device 200 to form source/drain vias, such as a source/drain via 330 over one of the source/drain contacts 300. The source/drain via formation process 320 may include forming a dielectric layer 350 over the isolation layer 220 and over the source/drain contacts 300. In some embodiments, the dielectric layer 350 may be another ILD, for example, similar to the ILD 185. The source/drain via formation process 320 may include forming one or more source/drain via trenches in the dielectric layer 350, which may be performed using one or more etching processes. The source/drain via trenches are then filled with a conductive material using one or more deposition processes. A polishing process such as a CMP process may be performed to remove portions of the deposited conductive material outside of the source/drain via trenches (e.g., portions disposed over the upper surface of the dielectric layer 350), until the upper surface of the source/drain via 330 is substantially co-planar with the upper surface of the dielectric layer 350. The source/drain via 330 is electrically coupled to one of the source/drain contacts 300 (and therefore to the source/drain component 122) therebelow and provide electrical connectivity thereto.

As shown in FIGS. 4-5, various segments of the isolation layer 220 provide electrical and physical isolation between the source/drain contacts 300. From the cross-sectional view, the various segments of the isolation layer 220 may be viewed as "cutting" through the source/drain contacts 300. Since each of source/drain contacts 300 may be referred to as an "MD", the isolation layer 220 may also be referred to as a "cut-MD" or "CMD" layer. In modern day semiconductor fabrication, the locations and dimensions of the various segments of the isolation layer 220 may be specified by an IC layout design. However, as semiconductor technology progresses to ever-smaller technology nodes, the rapidly shrinking geometry sizes of the various features of semiconductor devices also result in smaller spacing between adjacent segments of the isolation layer 220, which may present fabrication-related problems.

Figure 6:
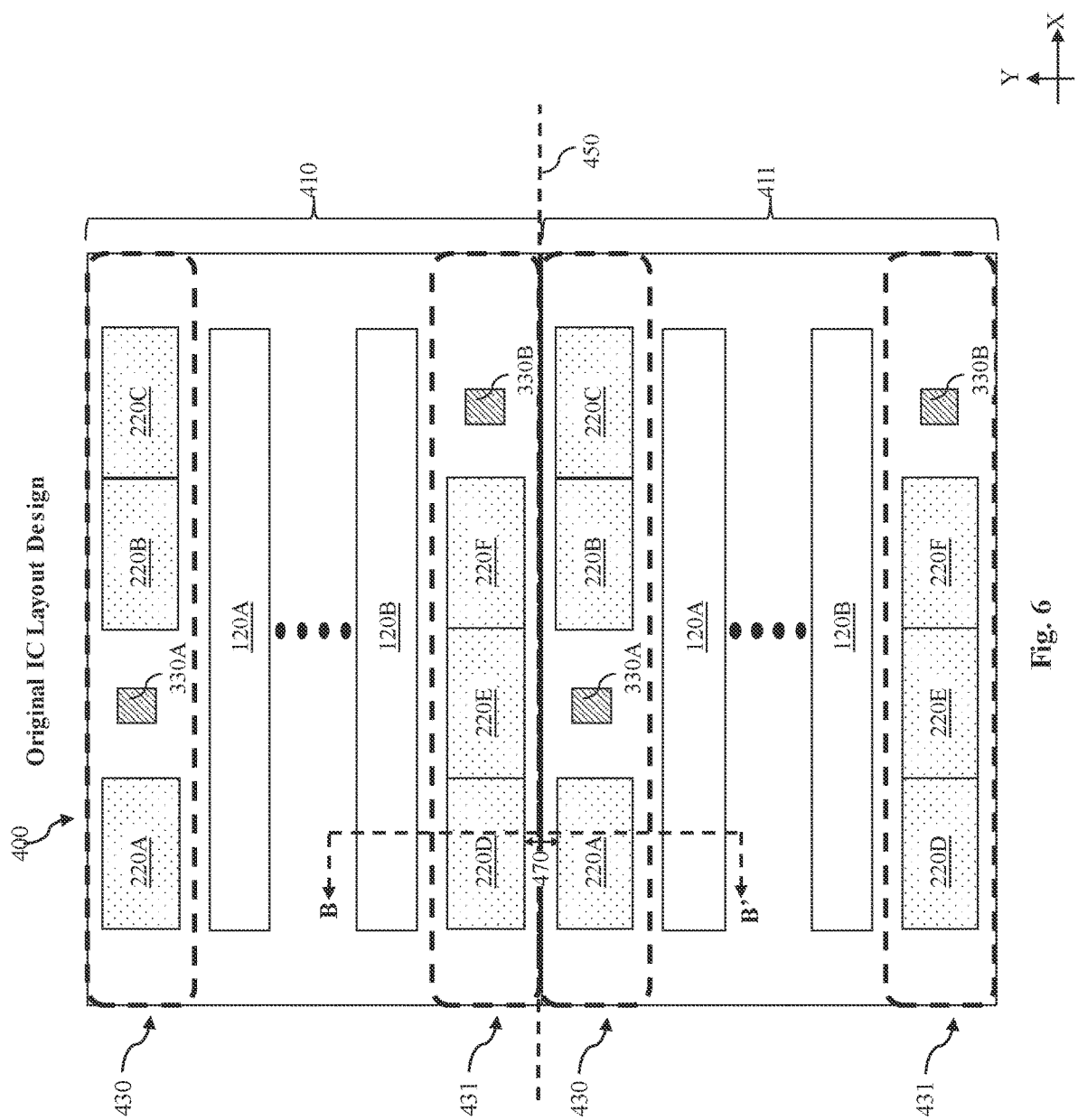
FIG. 6 illustrates a top view of an original IC layout design according to various aspects of the present disclosure.

For example, referring now to FIG. 6, a top view of a portion of an original IC layout design 400 is illustrated. In some embodiments, the original IC layout design 400 may be an IC layout design received from an IC design house. Such an IC layout design may be in the format of one or more electronic files, such as a Graphic Data System (GDS) file. The original IC layout design 400 may include a plurality of IC circuit cells, which may be arranged in columns and/or rows. For reasons of simplicity, two of such IC circuit cells 410 and 411 are illustrated in FIG. 6, but it is understood that the original IC layout design 400 may include many more other IC circuit cells, some of which may be similar to the IC circuit cells 410 and 411, while others may be different from the IC circuit cells 410 and 411. It is also understood that the various IC components illustrated in FIG. 6 may belong to different layers (e.g., having different physical properties and have different vertical locations in a cross-sectional view). However, these IC components from the different layers are "superimposed" together in the top view of FIG. 6 to facilitate the understanding of the present disclosure.

In the embodiment shown in FIG. 6, the IC circuit cells 410 and 411 are configured to be identical to one another. In other words, they include the same components that are configured or laid out the same way. For example, the IC circuit cells 410 and 411 each include a plurality of active regions, such as active regions 120A and 120B, that extend in the X-direction. In some embodiments, the active region 120A may be an N-type active region, and the active region 120B may be a P-type active region, or vice versa. In some embodiments, the IC circuit cells 410 and 411 may each include a plurality of other active regions that are located between the active regions 120A and 120B, but for reasons of simplicity, these additional active regions are not specifically shown herein.

The IC circuit cells 410 and 411 also each include a plurality of isolation segments, such as isolation segments 220A, 220B, 220C, 220D, 220E, and 220F, that are segments or portions of the isolation layer 220 discussed above with reference to FIGS. 4-5. As discussed above, these isolation segments 220A-220F may provide electrical and physical isolation for the source/drain contacts (e.g., the source/drain contact 300 shown in FIG. 5) in the IC circuit cells 410-411. For reasons of simplicity, the source/drain contacts are not specifically illustrated in the top view of FIG. 6.

The isolation segments 220A-220C and 220D-220F are located in power rail regions 430 and 431 of each of the IC circuit cells 410 and 411, respectively. In more detail, each of the IC circuit cells 410-411 includes a power rail region 430 located at the "top" thereof and another power rail region 431 located at the "bottom" thereof in the top view. The power rail regions 430 and 431 are regions of the IC circuit cells 410-411 where power supply lines (e.g., Vdd) and/or electrical ground (e.g., Vss) for the transistors are located. The isolation segments 220A-220C are located in the power rail region 430, in which the isolation segments 220B and 220C are disposed directly adjacent to one another, and the isolation segments 220A and 220B are separated by a gap. The isolation segments 220D-220F are located in the power rail region 431, in which the isolation segments 220E is disposed directly between the isolation segments 220D and 220F.

A source/drain via 330A and a source/drain via 330B (which is disposed above the source/drain contact 300 in the cross-sectional view, as shown in FIG. 5) are also shown in the top view of FIG. 6, where the source/drain via 330A is disposed between the isolation segments 220A and 220B, whole the source/drain via 330B is disposed to the "right" of the isolation segment 220F in the top view. These source/drain vias 330A and 330B may be formed over respective source/drain contacts in the manner illustrated in FIG. 6, but again, these source/drain contacts are not specifically illustrated herein for reasons of simplicity.

It is understood that while each of the IC circuit cells 410-411 includes a plurality of other IC components (e.g., gate structures, source/drain regions, gate contacts/vias, source/drain contacts, and/or metal lines of an interconnect structure), these additional IC components are also not specifically illustrated herein for reasons of simplicity and clarity.

Still referring to FIG. 6, the IC circuit cells 410 and 411 are "stacked" next to one another in the top view, such that the power rail region 431 of the IC circuit cell 410 directly and physically abuts the power rail region 430 of the IC circuit cell 411. Such a direct abutment forms a boundary 450 or an interface 450 (represented by dashed lines in FIG. 6) between the power rail regions 431 and 430 (and between the IC circuit cells 410 and 411), where such a boundary or interface 450 extends in the X-direction.

As semiconductor device sizes continue to get scaled down, the dimensions of the various components of the IC circuit cells 410-411 and distances between these components also shrink, which could create problems. For example, a distance 470 separates the isolation segments 220D-220F of the power rail region 431 of the IC circuit cell 410 from the isolation segments 220A-220B of the power rail region 430 of the IC circuit cell 411 in the Y-direction. For the sake of illustration, such a distance 470 is shown as the distance between the "bottom" boundary of the isolation segment 220D of the IC circuit cell 410 and the "top" boundary of the isolation segment 220A of the IC circuit cell 411. For newer semiconductor fabrication technology nodes such as the 10-nanometer node, the 7-nanometer node, or the 5-nanometer node, the distance 470 may shrink to less than or equal to about 3 nanometers. The shrinking of this distance 470 may give rise to problems in semiconductor fabrication.

Figure 7:
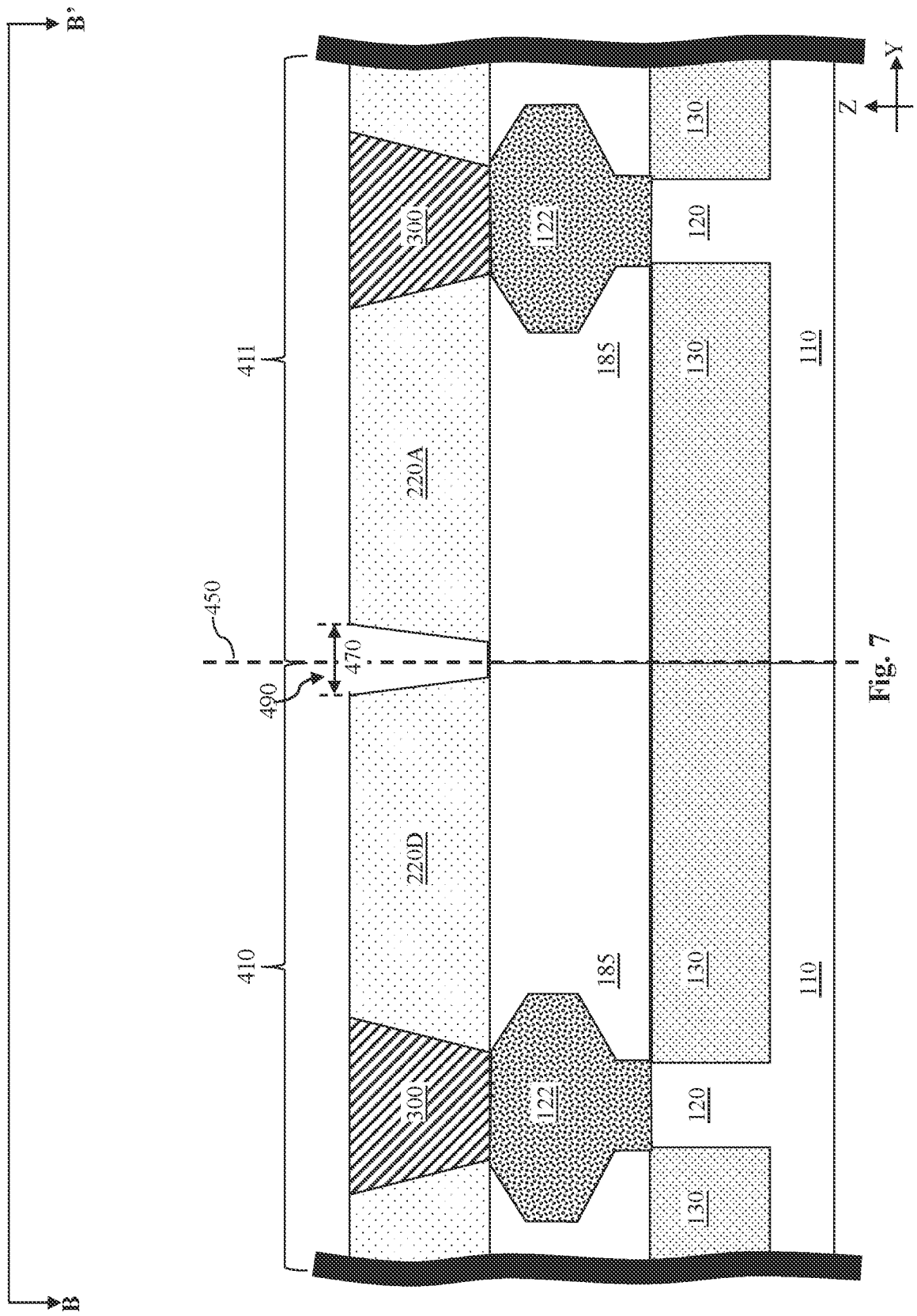
FIG. 7 is a cross-sectional side view of an IC device at a stage of fabrication according to various aspects of the present disclosure.

Such a problem is illustrated more clearly in FIG. 7, which is a simplified cross-sectional fragmentary side view of a portion of the IC circuit cell 410 and a portion of the IC circuit cell 411 abutted together, based on the original IC layout design 400. This cross-sectional view of FIG. 7 is taken along a cutline B-B' shown in FIG. 6. As shown in FIG. 7, the IC circuit cell 410 directly abuts the IC circuit cell 411 at the interface 450. However, the distance 470 between the isolation segments 220D and 220A may result in a trench 490 during the fabrication of the IC circuit cells 410-411. Such a trench 490 may be etched at the same time the source/drain contact trenches (e.g., the trenches 250 of FIG. 3) were etched, since the absence of the isolation segments (in the top view) corresponds to the locations of the source/drain contact trenches, which are later filled by a conductive material to form the source/drain contacts, such as the source/drain contacts 300. Unfortunately, the small distance 470 (e.g., <=3 nanometers) may mean that it is difficult to accurately resolve the trench 490 based on current lithography techniques, and any resulting trench 490 may be too narrow to fill. For example, whereas the wider source/drain trenches are filled with the conductive material to form source/drain contacts 300, such a deposition process may trap an air gap in the trench 490, which is considered a defect. In other cases, the location of the trench 490 (if a trench is formed at all) may vary or shift, which means that to the extent such a trench 490 is filled with a conductive material, the conductive material could lead to inadvertent electrical shorting (e.g., electrical bridging) elsewhere on the IC device.

Figure 8:
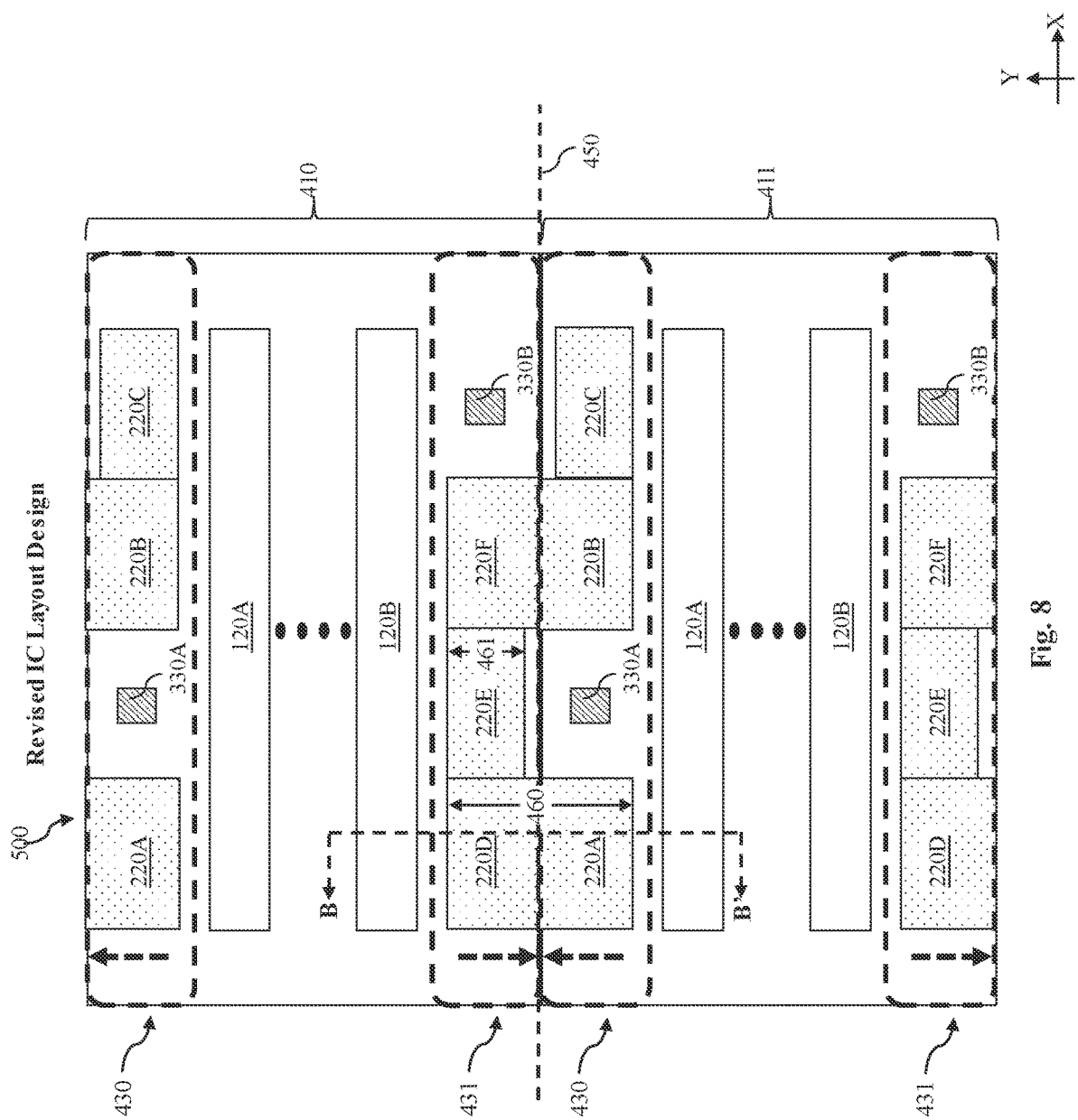
FIG. 8 illustrates a top view of a revised IC layout design according to various aspects of the present disclosure.

To address the problems discussed above, the present disclosure revises the original IC layout design 400 to generate a revised IC layout design 500, a top view of which is shown in FIG. 8. In some embodiments, the revised IC layout design 500 is generated by a semiconductor fabrication foundry or an entity that manufactures ICs. Such a foundry or IC manufacturing entity may obtain the original IC layout design 400 (e.g., in the format of a GDS file) from the IC design house that created the original IC layout design. After receiving the original IC layout design 400, the foundry or IC manufacturing entity may then electronically scan the original IC layout design 400 to identify regions of interest, for example regions where the small spacing between adjacently located isolation segments may cause potential problems. In some embodiments, the regions of interest may include the power rail regions that have been abutted next to one another, such as the power rail regions 430 and 431 shown in FIGS. 6 and 8, since the abutment of the power rail regions 430-431 between adjacent IC circuit cells 411 and 410 may lead to the small spacing issue between the isolation segments located in these power rail regions 430-431.

In any case, after identifying the regions of interest (e.g., the power rail regions that have been abutted together), the foundry or manufacturing entity may then identify the isolation segments that are located within the regions of interest. The foundry or manufacturing entity may then determine which of the isolation segments is located too close to another isolation segment, for example, segments being separated from one another by a distance smaller than a predefined threshold distance. In some embodiments, the predefined threshold distance is about 3 nanometers, that is, isolation structures that are located within 3 nanometers (or less) of any other isolation structure are determined to be the candidates for being resized.

Such a resizing of the isolation segments is demonstrated in FIG. 8. In more detail, the revised IC layout design 500 is substantially similar to the original IC layout design 400, except that the isolation segments 220A, 220B, 220D and 220F are enlarged in the Y-direction. Specifically, the isolation segments 220A, 220B, 220D, and 220F are determined (using the algorithm discussed above) to be candidates for size enlargement, because they are located within 3 nanometers of another isolation segment. Thus, the isolation segments 220A and 220B of the IC circuit cell 410 are each "stretched" in the Y-direction away from the interface 450, the isolation segments 220D and 220F of the IC circuit cell 410 are each "stretched" in the Y-direction toward the interface 450, the isolation segments 220A and 220B of the IC circuit cell 411 are each "stretched" in the Y-direction toward the interface 450, and the isolation segments 220D and 220F of the IC circuit cell 411 are each "stretched" in the Y-direction away from the interface 450.

Note that the enlargement of the isolation segments 220A and 220B in the IC circuit cell 410 is performed to facilitate their merger into corresponding isolation segments 220D and 220F of another IC circuit cell (not shown in FIG. 8) that is stacked "above" the IC circuit cell 410. Similarly, the enlargement of the isolation segments 220D and 220F in the IC circuit cell 411 is performed to facilitate their merger into corresponding isolation segments 220A and 220B of another IC circuit cell (not shown in FIG. 8) that is stacked "below" the IC circuit cell 411.

Also note that while the isolation segments 220A, 220B, 220D, and 220F are enlarged, the isolation segments 220C and 220E may remain the same in the illustrated embodiment. As such, each of the isolation segments 220A, 220B, 220D, and 220F (i.e., enlarged isolation segments) has a greater dimension in the Y-direction than each of the isolation segments 220E and 220C (i.e., isolation segments that have their original sizes). In the illustrated embodiment in FIG. 8, the isolation segments 220A and 220D, after being merged, have a collective dimension 460 measured in the Y-direction, while the isolation segments 220E and 220C each have a dimension 461 measured in the Y-direction. The dimension 460 is at least two times larger than the dimension 461. In some embodiments, a ratio between the dimension 460 and the dimension 461 is in a range between about 2 and about 2.5. Such a ratio range is not randomly chosen but specifically configured to ensure that the appropriate isolation segments are enlarged sufficiently to merge into the corresponding isolation segments in the abutted IC circuit cell. It is also understood that in certain other embodiments, the isolation segments 220C and 220E may also be optionally enlarged.

In any case, the enlargement of the isolation segments 220A, 220B, 220D, and 220F in the Y-direction causes the isolation segments 220D and 220F of the IC circuit cell 410 to merge into the isolation segments 220A and 220B of the IC circuit cell 411, respectively. In this manner, any gap (corresponding to the distance 470) that previously separates the isolation segments 220D-220F of the IC circuit cell 410 and the isolation segments 220A-220C of the IC circuit cell 411 under the original IC layout design 400 is eliminated. In other words, there is no longer the trench 490 or the defect (e.g., trapped air gap) associated therewith at the interface 450 between the abutted IC circuit cells 410 and 411.

Figure 9:
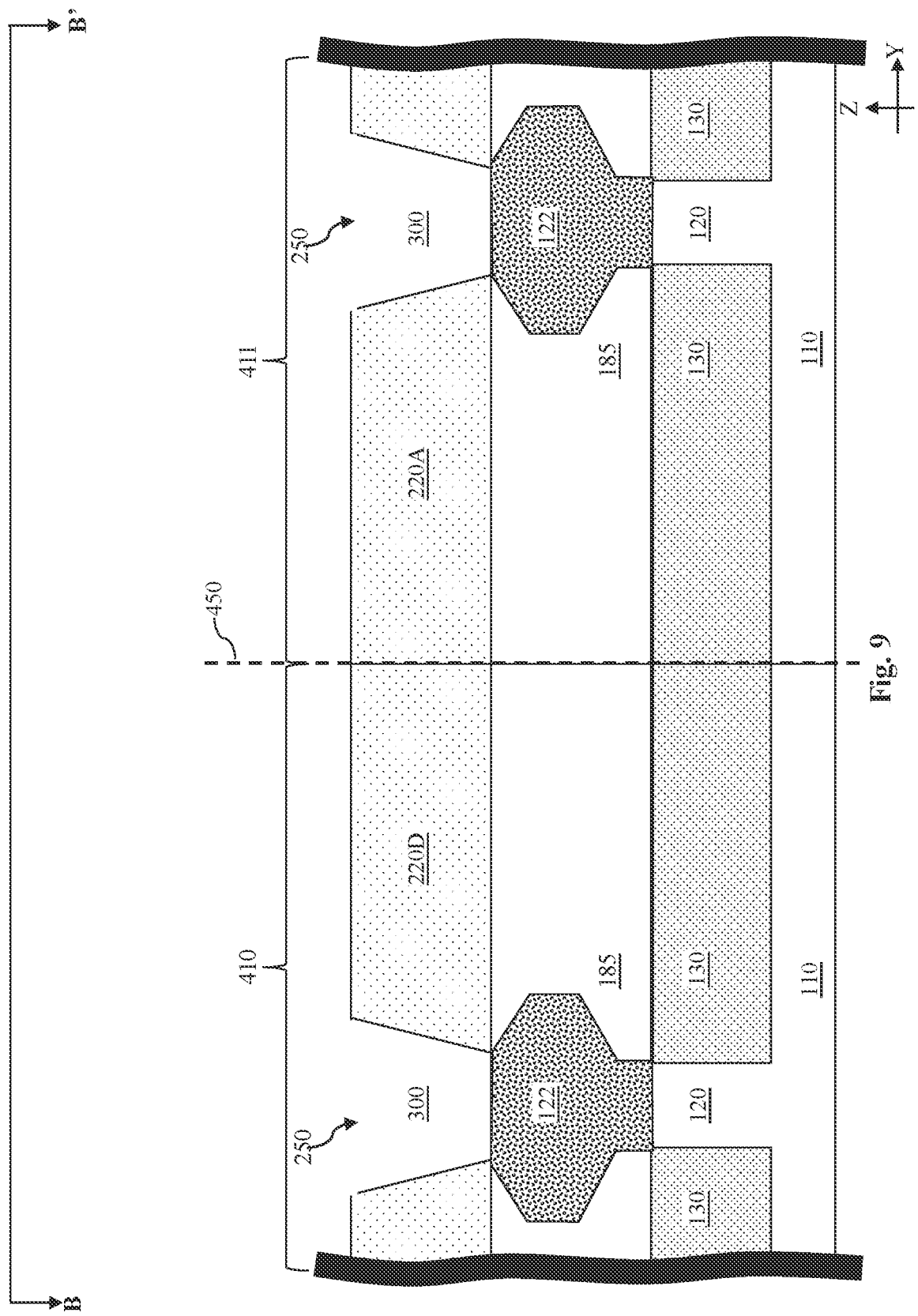
FIGS. 9-10 are cross-sectional side views of an IC device at various stages of fabrication according to various aspects of the present disclosure.
Figure 10:
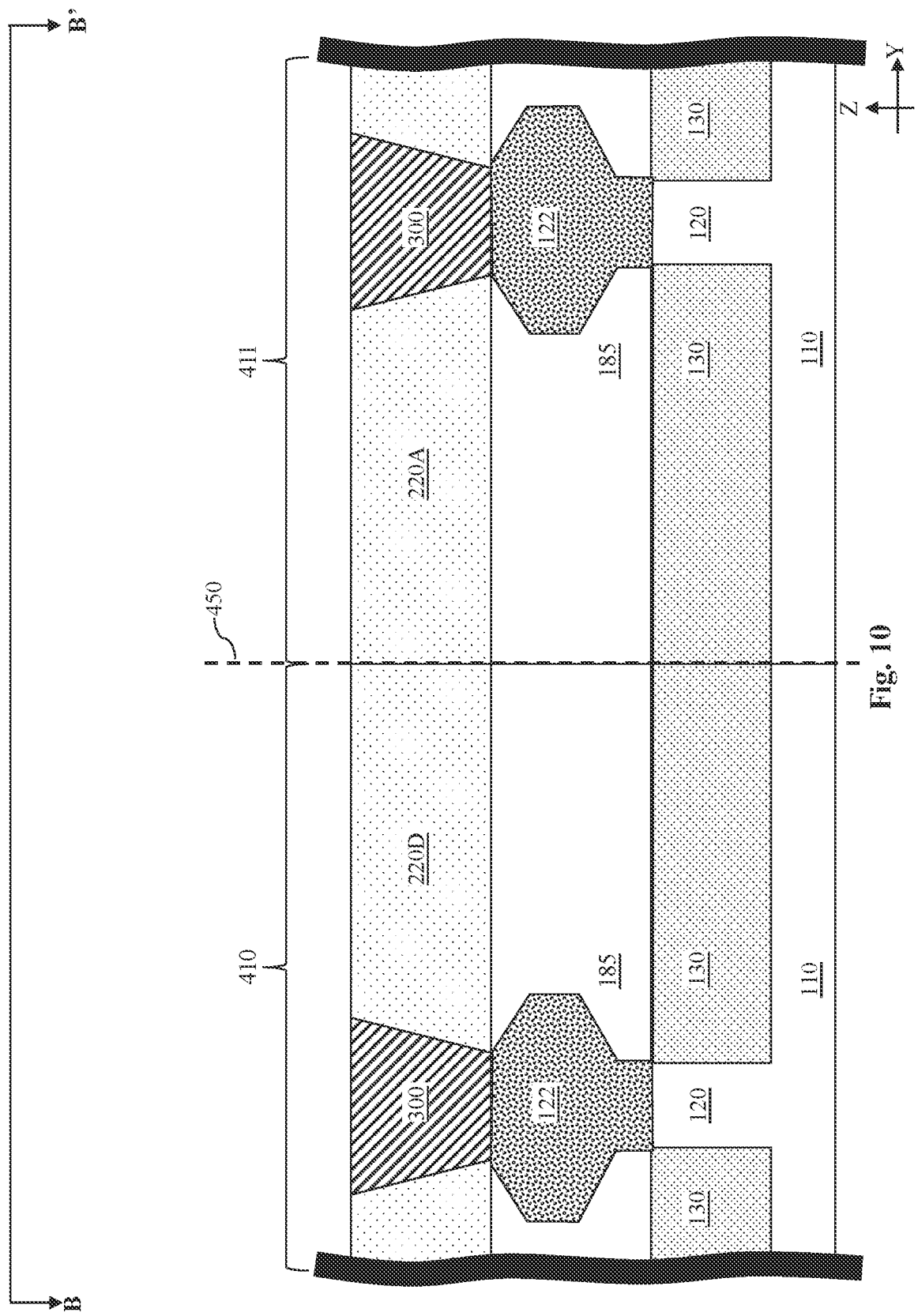

This is clearly illustrated in FIGS. 9-10, which are cross-sectional fragmentary side views of a portion of the IC circuit cell 410 and a portion of the IC circuit cell 411 abutted together at different stages of fabrication, based on the revised IC layout design 500. Similar to FIG. 7, the cross-sectional view of FIGS. 9-10 is taken along the cutline B-B' shown in FIG. 8. As shown in FIG. 9, the IC circuit cell 410 still directly abuts the IC circuit cell 411 at the interface 450. However, there is no longer any separation between the isolation segments 220D and 220A in the Y-direction as the IC circuit cells 410-411 are fabricated according to the revised IC layout design 500. In other words, the isolation segments 220A and 220D may be viewed as a single isolation segment that spans across the boundary or interface 450, and this single isolation segment is disposed directly between the source/drain contacts 300 from the IC circuit cells 410 and 411. As such, as source/drain contact trenches 250 are etched to extend vertically through the isolation layer 220 and to expose the upper surfaces of the source/drain components 122 therebelow, no such trench (similar to the trench 490 of FIG. 7) is etched through the isolation layer 220 at the interface 450 between the source/drain contact trenches 250. As such, the IC device fabricated according to the revised IC layout design 500 would not have difficulties resolving such a trench 490, such it no longer needs to be formed according to the revised IC layout design 500.

Thereafter, when the source/drain contact trenches 250 are filled with a conductive material to form the source/drain contacts 300, as shown in FIG. 10, the IC device fabricated according to the revised IC layout design 500 would not trap air gaps in the trench 490 or cause electrical bridging or other defects associated with such a trench 490 either, since the trench 490 no longer exists. In this manner, by merging the isolation segments 220D and 220A together, the revised IC layout design 500 effectively eliminates potential defects that could have arisen under the original IC layout design 400. It is understood that the merging of the isolation segments 220F and 220B also eliminates similar potential defects that could have arisen under the original IC layout design 400.

Figure 11:
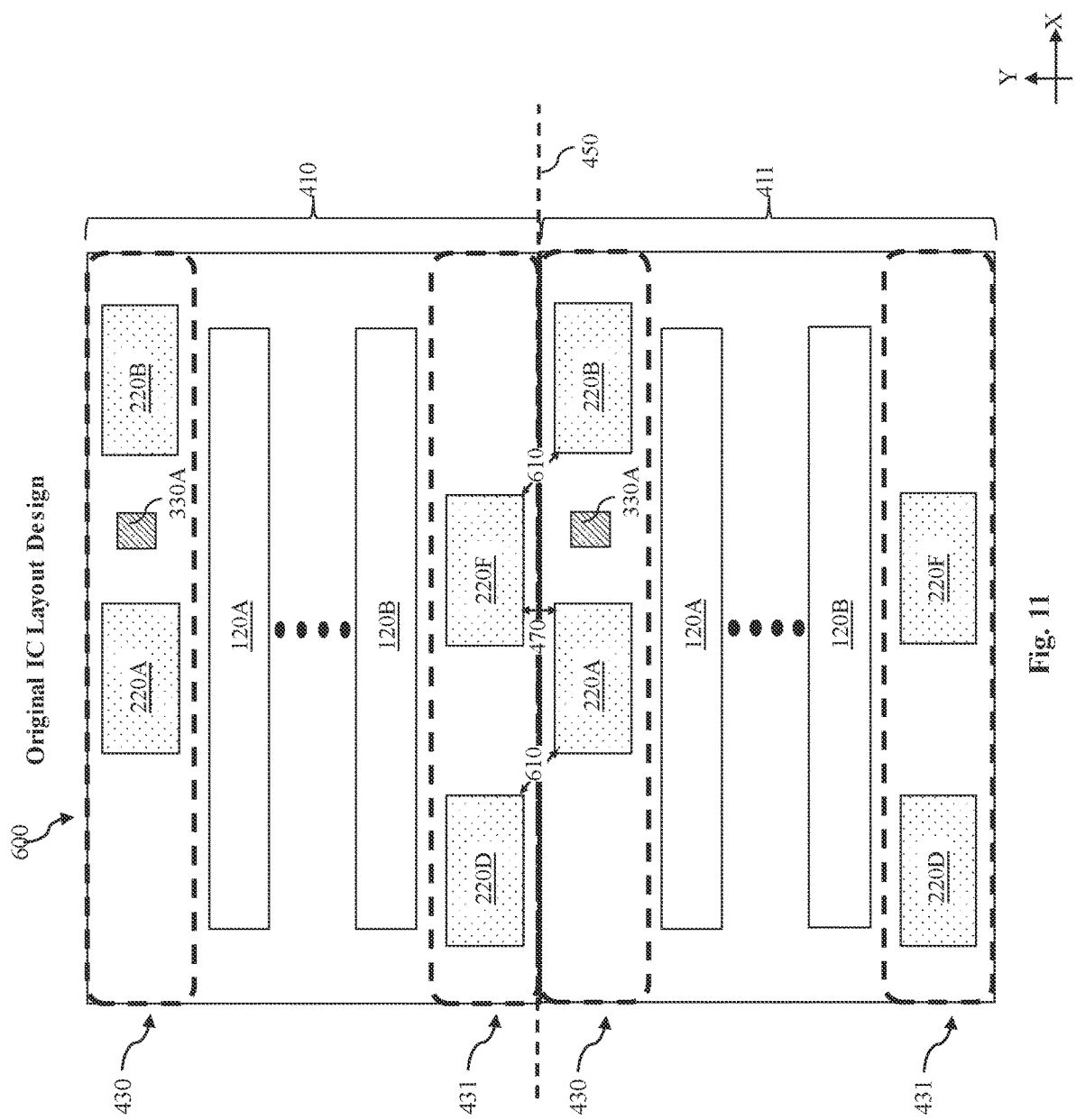
FIG. 11 illustrates a top view of an original IC layout design according to various aspects of the present disclosure.
Figure 12:
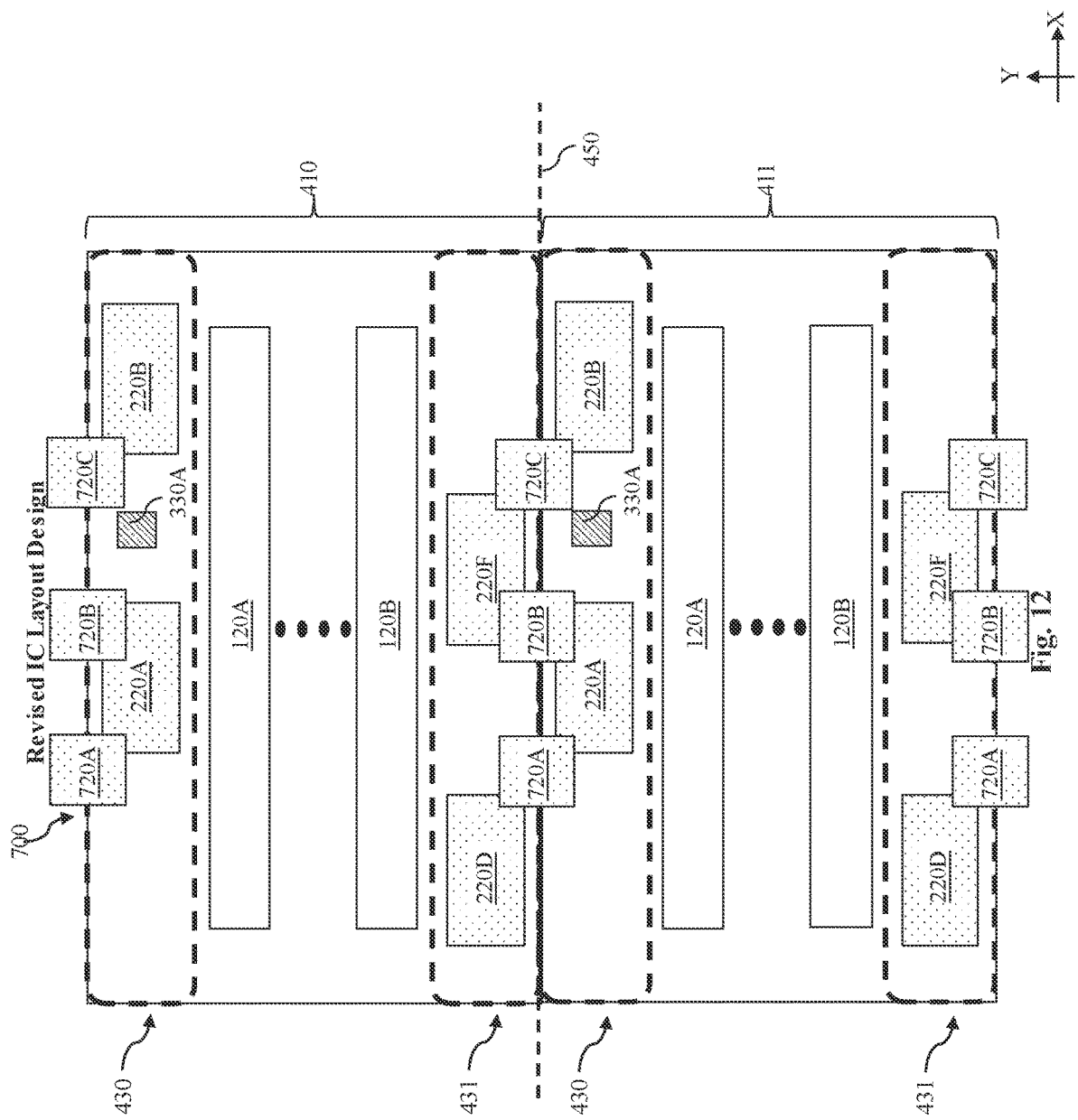
FIG. 12 illustrates a top view of a revised IC layout design according to various aspects of the present disclosure.
Figure 13:
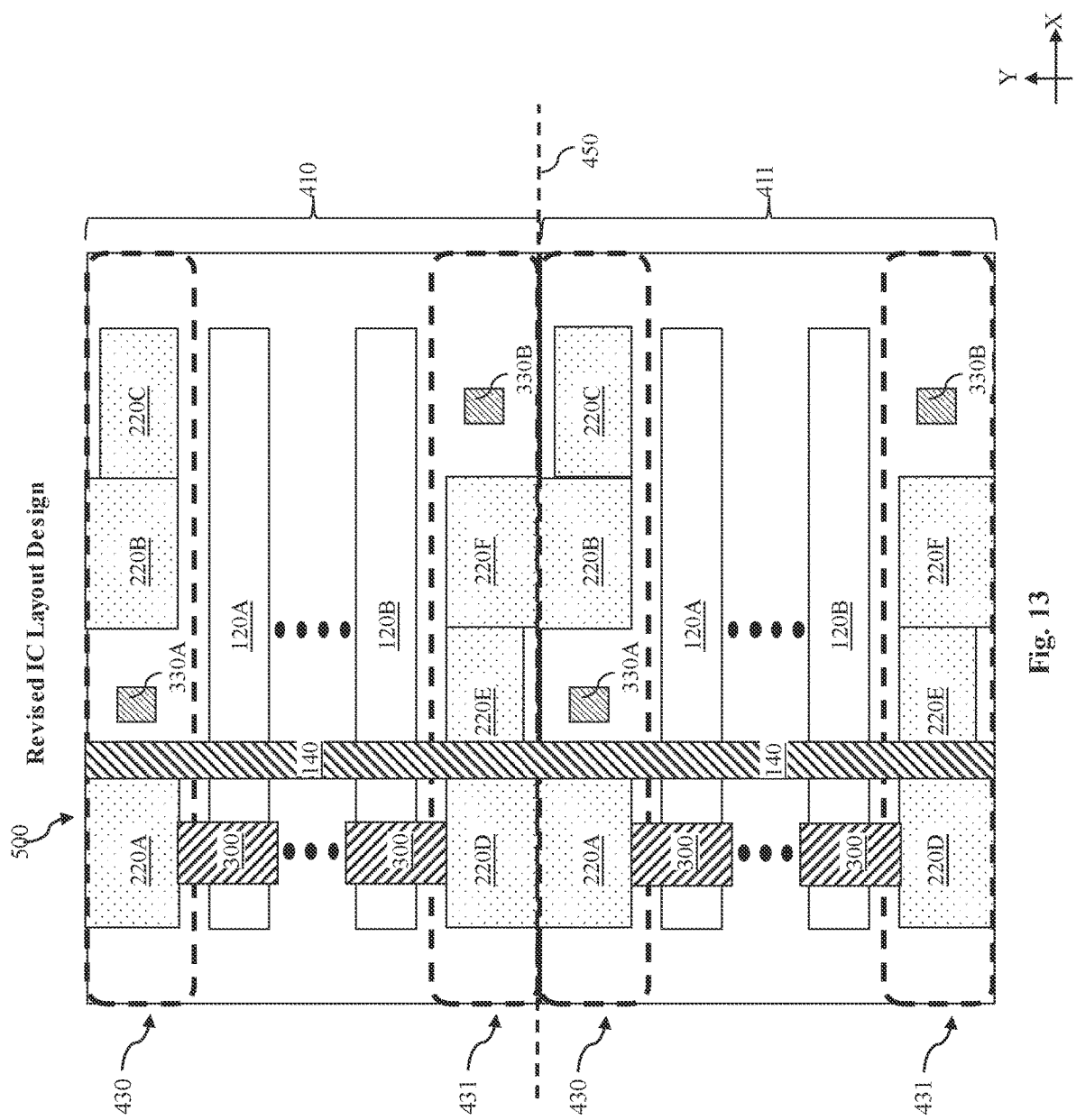
FIG. 13 illustrates a top view of a revised IC layout design according to various aspects of the present disclosure.

FIGS. 6 and 8 illustrate top views of revising an original IC layout design into a new IC layout design according to a first embodiment of the present disclosure. FIGS. 11-12, as will be discussed below in more detail, illustrate top views of revising an original IC layout design into a new IC layout design according to a second embodiment of the present disclosure. For reasons of consistency and clarity, similar components appearing in FIGS. 6-8 will be labeled the same in FIGS. 11-12.

Referring now to FIG. 11, an original IC layout design 600 is illustrated. Again, such an original IC layout design 600 may be created by an IC design house and may include an electronic file in a GDS format. The original IC layout design 600 also includes the active regions 120A-120B, as well as a plurality of isolation segments of the isolation layer, such as the isolation segments 220A, 220B, 220D, and 220F located in the power rail regions 430 and 431, respectively. The original IC layout design 600 may also include source/drain vias, such as the source/drain via 330A.

Unlike the original IC layout design 400 of FIG. 6 discussed above, however, the isolation segments of the original IC layout design 600 are configured slightly differently. For example, while a distance 470 still separates the isolation segments 220F and the 220A in the Y-direction, the isolation segments 220D and 220A are diagonally spaced apart by a diagonal distance 610. This diagonal distance 610 is measured in a direction between the X-direction and the Y-direction and has respective components in both the X-direction and the Y-direction. Nevertheless, as the semiconductor device scaling down continues, the shrinking of the diagonal distance 610 may also give rise to the same problems discussed above. For example, as the diagonal distance 610 shrinks to below about 3 nanometers, the resulting IC device may have defects, such as defects related to air gaps, etc. At the same time, the small distance 470 (e.g., less than about 3 nanometers) may also lead to the same defects.

To overcome these problems, the second embodiment of the present disclosure may add patches to the original IC layout design to generate a revised IC layout design 700, shown in FIG. 12. For example, a semiconductor foundry or manufacturing entity may obtain the original IC layout design 600 from the IC design house, scan it to identify regions of interest, such as the power rail regions 430 and 431. Thereafter, the pairs of isolation segments that are located within a predefined threshold (e.g., 3 nanometers or less) of each other are identified, which in this example may include the following pairs:

the isolation structures 220D and 220A (due to their diagonal distance 610 being within the predefined threshold);

the isolation structures 220F and 220A (due to their vertical distance 470 being within the predefined threshold); and the isolation structures 220F and 220B (due to their diagonal distance 610 being within the predefined threshold).

The semiconductor foundry or manufacturing entity may then generate the new or revised IC layout design 700 by adding patches between these identified pairs of isolation segments. As shown in FIG. 12, a patch 720A is added between the isolation segments 220D and 220A, a patch 720B is added between the isolation segments 220F and 220A, and a patch 720C is added between the isolation segments 220F and 220B. The sizes of the patches 720A-720C are configured such that they each merge into their respective pairs of isolation segments. Alternatively stated, the patch 720A at least partially overlaps with, or protrudes into, the isolation segments 220D and 220A in the top view, the patch 720B at least partially overlaps with, or protrudes into, the isolation segments 220F and 220A in the top view, and the patch 720C at least partially overlaps with, or protrudes into, the isolation segments 220F and 220B in the top view.

In some embodiments, the patches 720A-720C are configured to have the same properties as the isolation segments 220A-220F. For example, the patches 720A-720C may be formed using the same fabrication processes as the isolation segments 220A-220F and include the same materials as the isolation segments 220A-220F. In this manner, the patches 720A-720C may be viewed as extensions, or enlargements, of the isolation segments 220A-220F. When an IC device is fabricated according to the revised IC layout design 700, the patches 720A-720C essentially connect the isolation segments 220D-220A, 220F-220A, and 220F-220B together, which eliminates the problem caused by the small spacing between the isolation segments 220D-220A, 220F-220A, and 220F-220B. Consequently, the IC device fabricated according to the revised IC layout design may be free of the defects (e.g., air gaps or electrical bridging) associated with the small spacing between closely positioned isolation segments.

Regardless of the embodiment used to revise the original IC layout design, once the original IC layout design 400 or 600 has been revised, a design rule check process (which may be an automated process performed by one or more computer processors) may be performed to ensure that the revised IC layout design conforms to a set of predefined design/layout rules governing the design/layout of the IC devices. For example, the design rule check process may check whether the enlargement of the isolation segments or the implementations of the patches could trigger design/layout rule violations. As an example, a design rule may specify that among the various isolation segments (e.g., the isolation segments 220A-220F) of the isolation layer (i.e., the CMD layer), no two isolation segments should be spaced apart less than 3 nanometers. That is, any two isolation segments should have a spacing greater than about 3 nanometers therebetween. Once the design rule check process confirms that the revised IC layout design 500 or 700 does not violate any design/layout rules, then the revised IC layout design 500 or 700 may be used to manufacture actual IC devices.

The actually fabricated IC devices based on the revised IC layout design 500 or 700 may have various advantages over IC devices fabricated according to the original IC layout design 400 or 600. For example, the selective enlargement of the isolation segments and/or the selective addition of the patches effectively eliminates the need to form and fill narrow trenches (e.g., trenches 250 in FIG. 3) between isolation segments that are located closely together. Therefore, the defects or other imperfections related to forming and filling such narrow trenches may also be substantially reduced, if not eliminated altogether.

Another advantage is the reduction in parasitic capacitance. To illustrate this point, referring now to FIG. 13, which is a top view of the revised IC layout design 500, but with some of the source/drain contacts 300 and gate structures 140 of the IC circuit cells 410-411 shown. The source/drain contacts 300 and the gate structures 140 each contain metal and each extend in the Y-direction. Had the original IC layout design 400 not been revised, a source/drain-contact-like metal structure could have been formed in the space between the isolation segments 220D and 220A, spanning across the boundary 450 between the IC circuit cells 410 and 411 in the top view. Had such a source/drain-contact-like metal structure been formed, it would effectively serve as one electrode of a parasitic capacitor, while the metal-containing gate electrode would serve as the other electrode of the parasitic capacitor, and the dielectric material (e.g., ILD) disposed between them would serve as the dielectric of the parasitic capacitor. Such a parasitic capacitor is undesirable, as it could degrade device performance, such as device speed. However, since the revised IC layout design 500 merges the isolation segments 220D and 220A together and eliminates the possibility of forming such a metal-containing structure therebetween, the parasitic capacitor would not have been formed in the first place. As such, device performance may be improved.

Figure 14:
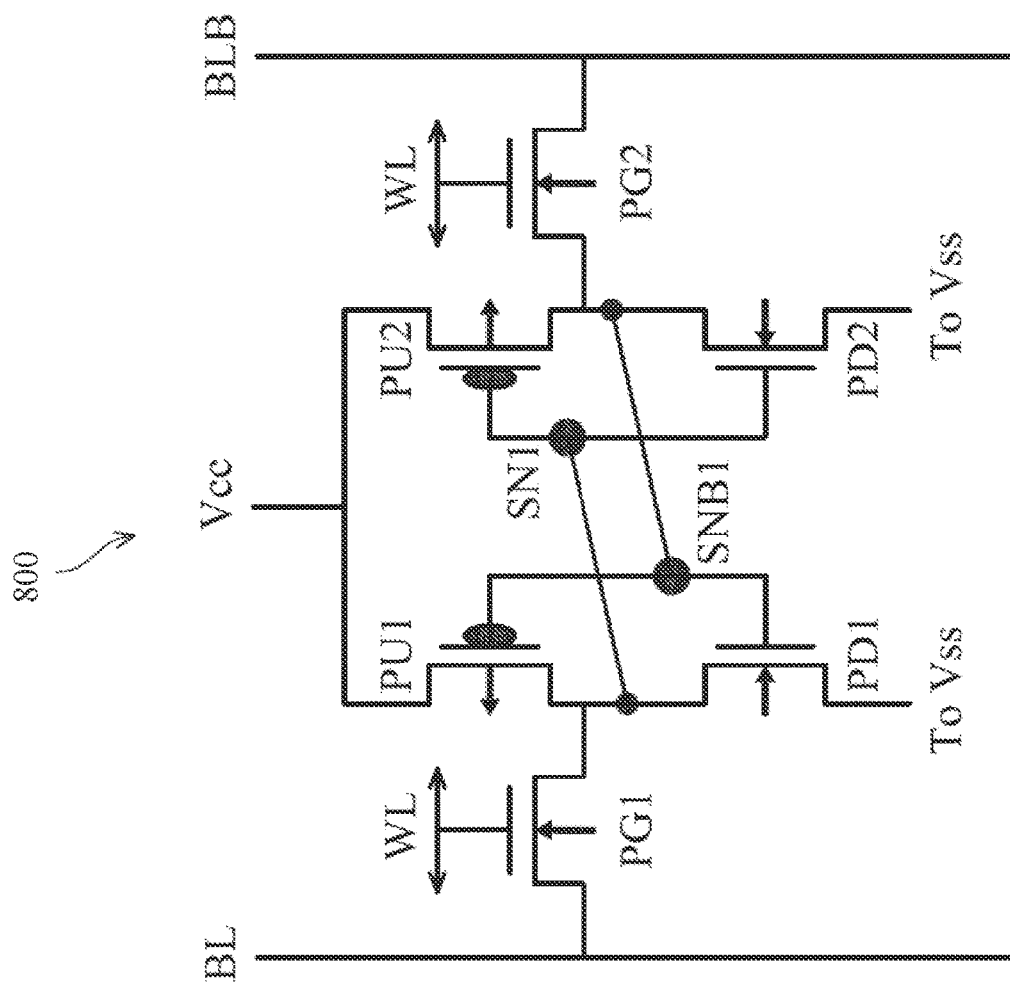
FIG. 14 is a circuit schematic of an SRAM cell according to various aspects of the present disclosure.

The IC device 200 may be implemented in a variety of IC applications, including memory devices such as Static Random-Access Memory (SRAM) devices. In that regard, FIG. 14 illustrates an example circuit schematic for a single-port SRAM cell (e.g., 1-bit SRAM cell) 800. The single-port SRAM cell 800 includes pull-up transistors PU1, PU2; pull-down transistors PD1, PD2; and pass-gate transistors PG1, PG2. As show in the circuit diagram, transistors PU1 and PU2 are p-type transistors, and transistors PG1, PG2, PD1, and PD2 are n-type transistors. According to the various aspects of the present disclosure, the PG1, PG2, PD1, and PD2 transistors are implemented with thinner spacers than the PU1 and PU2 transistors. Since the SRAM cell 800 includes six transistors in the illustrated embodiment, it may also be referred to as a 6 T SRAM cell.

The drains of pull-up transistor PU1 and pull-down transistor PD1 are coupled together, and the drains of pull-up transistor PU2 and pull-down transistor PD2 are coupled together. Transistors PU1 and PD1 are cross-coupled with transistors PU2 and PD2 to form a first data latch. The gates of transistors PU2 and PD2 are coupled together and to the drains of transistors PU1 and PD1 to form a first storage node SN1, and the gates of transistors PU1 and PD1 are coupled together and to the drains of transistors PU2 and PD2 to form a complementary first storage node SNB1. Sources of the pull-up transistors PU1 and PU2 are coupled to power voltage Vcc (also referred to as Vdd), and the sources of the pull-down transistors PD1 and PD2 are coupled to a voltage Vss, which may be an electrical ground in some embodiments.

The first storage node SN1 of the first data latch is coupled to bit line BL through pass-gate transistor PG1, and the complementary first storage node SNB1 is coupled to complementary bit line BLB through pass-gate transistor PG2. The first storage node N1 and the complementary first storage node SNB1 are complementary nodes that are often at opposite logic levels (logic high or logic low). Gates of pass-gate transistors PG1 and PG2 are coupled to a word line WL. SRAM devices such as the SRAM cell 800 may be implemented using "planar" transistor devices, with FinFET devices, and/or with GAA devices. Therefore, the IC layout design revision process discussed above may be performed for SRAM devices.

Figure 15:
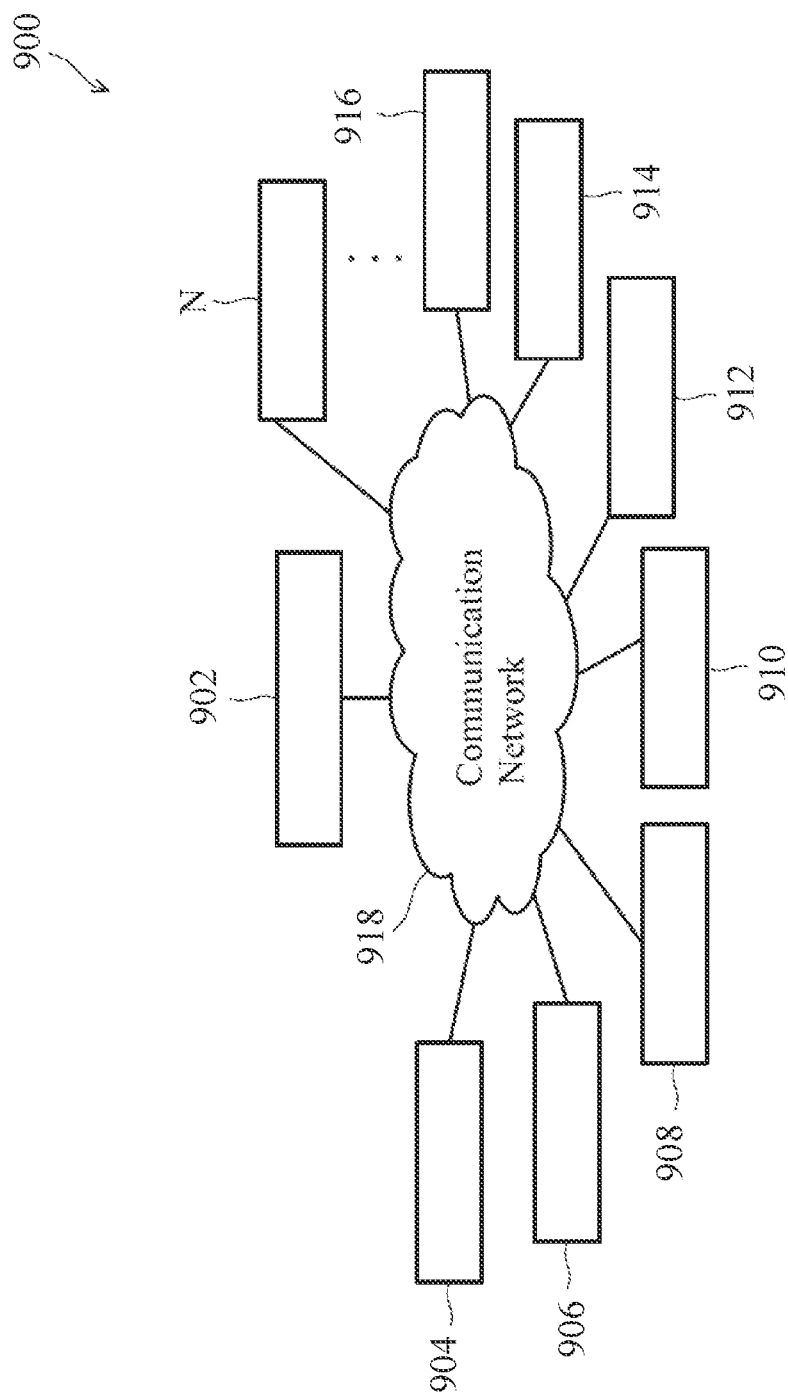
FIG. 15 is a block diagram of a manufacturing system according to various aspects of the present disclosure.

FIG. 15 illustrates an integrated circuit fabrication system 900 according to embodiments of the present disclosure. The fabrication system 900 includes a plurality of entities 902, 904, 906, 908, 910, 912, 914, 916 . . . , N that are connected by a communications network 918. The network 918 may be a single network or may be a variety of different networks, such as an intranet and the Internet, and may include both wire line and wireless communication channels.

In an embodiment, the entity 902 represents a service system for manufacturing collaboration; the entity 904 represents an user, such as product engineer monitoring the interested products; the entity 906 represents an engineer, such as a processing engineer to control process and the relevant recipes, or an equipment engineer to monitor or tune the conditions and setting of the processing tools; the entity 908 represents a metrology tool for IC testing and measurement; the entity 910 represents a semiconductor processing tool, such an EUV tool that is used to perform lithography processes to define the gate spacers of an SRAM device; the entity 912 represents a virtual metrology module associated with the processing tool 910; the entity 914 represents an advanced processing control module associated with the processing tool 910 and additionally other processing tools; and the entity 916 represents a sampling module associated with the processing tool 910.

Each entity may interact with other entities and may provide integrated circuit fabrication, processing control, and/or calculating capability to and/or receive such capabilities from the other entities. Each entity may also include one or more computer systems for performing calculations and carrying out automations. For example, the advanced processing control module of the entity 914 may include a plurality of computer hardware having software instructions encoded therein. The computer hardware may include hard drives, flash drives, CD-ROMs, RAM memory, display devices (e.g., monitors), input/output device (e.g., mouse and keyboard). The software instructions may be written in any suitable programming language and may be designed to carry out specific tasks.

The integrated circuit fabrication system 900 enables interaction among the entities for the purpose of integrated circuit (IC) manufacturing, as well as the advanced processing control of the IC manufacturing. In an embodiment, the advanced processing control includes adjusting the processing conditions, settings, and/or recipes of one processing tool applicable to the relevant wafers according to the metrology results.

In another embodiment, the metrology results are measured from a subset of processed wafers according to an optimal sampling rate determined based on the process quality and/or product quality. In yet another embodiment, the metrology results are measured from chosen fields and points of the subset of processed wafers according to an optimal sampling field/point determined based on various characteristics of the process quality and/or product quality.

One of the capabilities provided by the IC fabrication system 900 may enable collaboration and information access in such areas as design, engineering, and processing, metrology, and advanced processing control. Another capability provided by the IC fabrication system 900 may integrate systems between facilities, such as between the metrology tool and the processing tool. Such integration enables facilities to coordinate their activities. For example, integrating the metrology tool and the processing tool may enable manufacturing information to be incorporated more efficiently into the fabrication process or the APC module, and may enable wafer data from the online or in site measurement with the metrology tool integrated in the associated processing tool.

Figure 16:
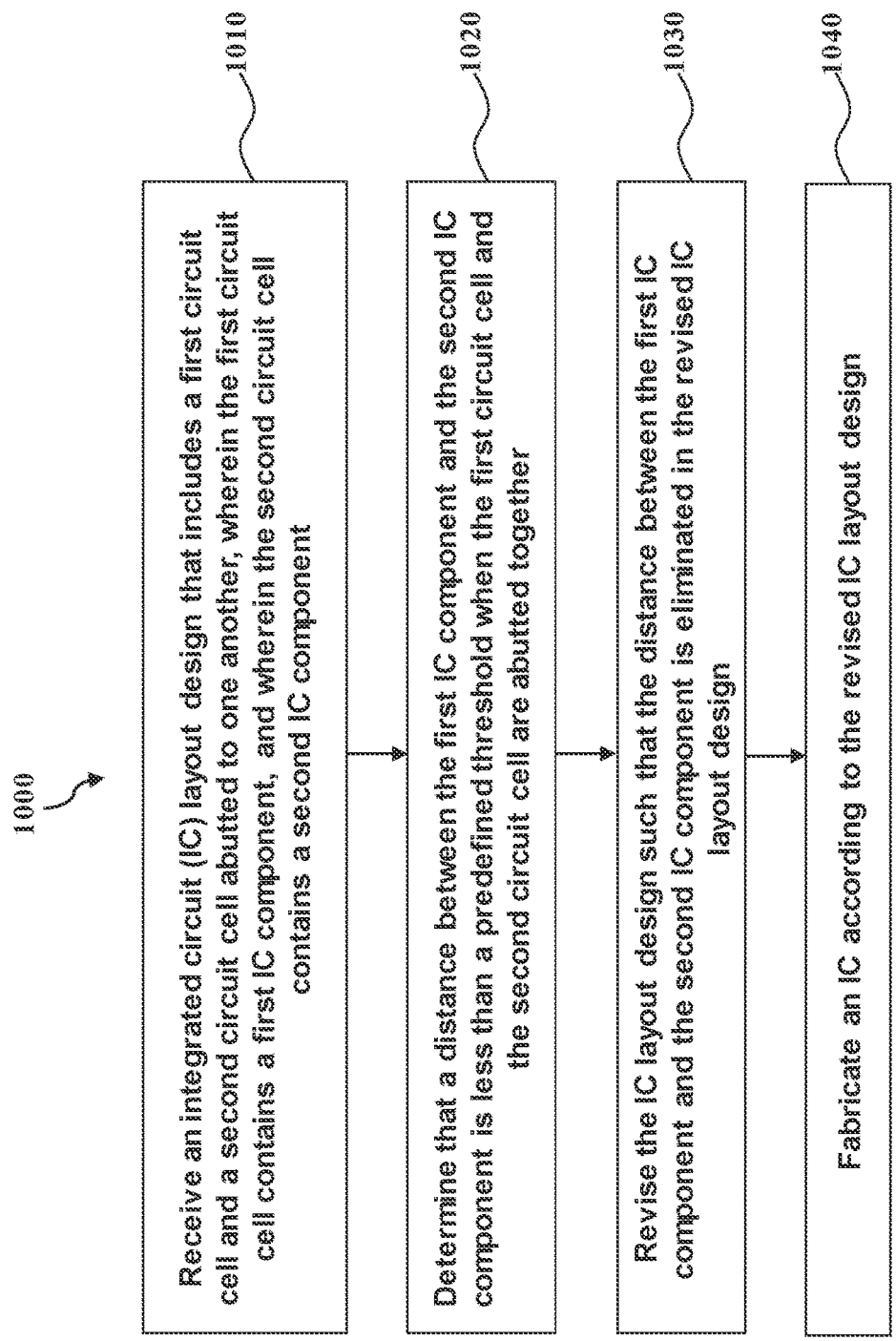
FIG. 16-17 each illustrates a flowchart of a method according to various aspects of the present disclosure.

FIG. 16 is a flowchart illustrating a method 1000 of revising an IC layout design and fabricating a semiconductor device according to the revised IC design layout design according to embodiments of the present disclosure. The method 1000 includes a step 1010 to receive an integrated circuit (IC) layout design that includes a first circuit cell and a second circuit cell abutted to one another. The first circuit cell contains a first IC component, and the second circuit cell contains a second IC component.

The method 1000 includes a step 1020 to determine that a distance between the first IC component and the second IC component is less than a predefined threshold when the first circuit cell and the second circuit cell are abutted together. In some embodiments, the predefined threshold is about 3 nanometers.

The method 1000 includes a step 1030 to revise the IC layout design such that the distance between the first IC component and the second IC component is eliminated in the revised IC layout design. In some embodiments, the step 1030 comprises enlarging the first IC component in a direction towards the second IC component and enlarging the second IC component in a direction towards the first IC component until the first IC component and the second IC component merge into one another. In some embodiments, the enlarging the first IC component and the enlarging the second IC component are performed without enlarging at least a subset of the other IC components.

In some embodiments, the step 1030 comprises adding a patch component connecting the first IC component and the second IC component. The patch component is configured to be manufactured by a plurality of same semiconductor fabrication processes used to fabricate the first IC component and the second IC component. In some embodiments, the patch is configured to connect the first IC component and the second IC component diagonally.

The method 1000 includes a step 1040 to fabricate an IC according to the revised IC layout design.

In some embodiments, the first IC cell contains a first source/drain contact; the first IC component includes a first isolation structure that is located directly adjacent to the first source/drain contact; the second IC cell contains a second source/drain contact; and the second IC component includes a second isolation structure that is located directly adjacent to the second source/drain contact.

In some embodiments, after the revising of the IC layout design, the merged first IC component and second IC component collectively span across a boundary between the first circuit cell and the second circuit cell.

In some embodiments, the first circuit cell contains a first power rail region; the second circuit cell contains a second power rail region; the first IC component is located in the first power rail region; and the second IC component is located in the second power rail region.

It is understood that the method 1000 may include further steps performed before, during, or after the steps 1010-1040. For example, the method 1000 may include steps of identifying, from the received IC layout design, a first power rail region in the first circuit cell; identifying, from the received IC layout design, a second power rail region in the second circuit cell; identifying the first IC component within the first power rail region; and identifying the second IC component in the second power rail region. For reasons of simplicity, these additional steps are not discussed herein in detail.

Figure 17:
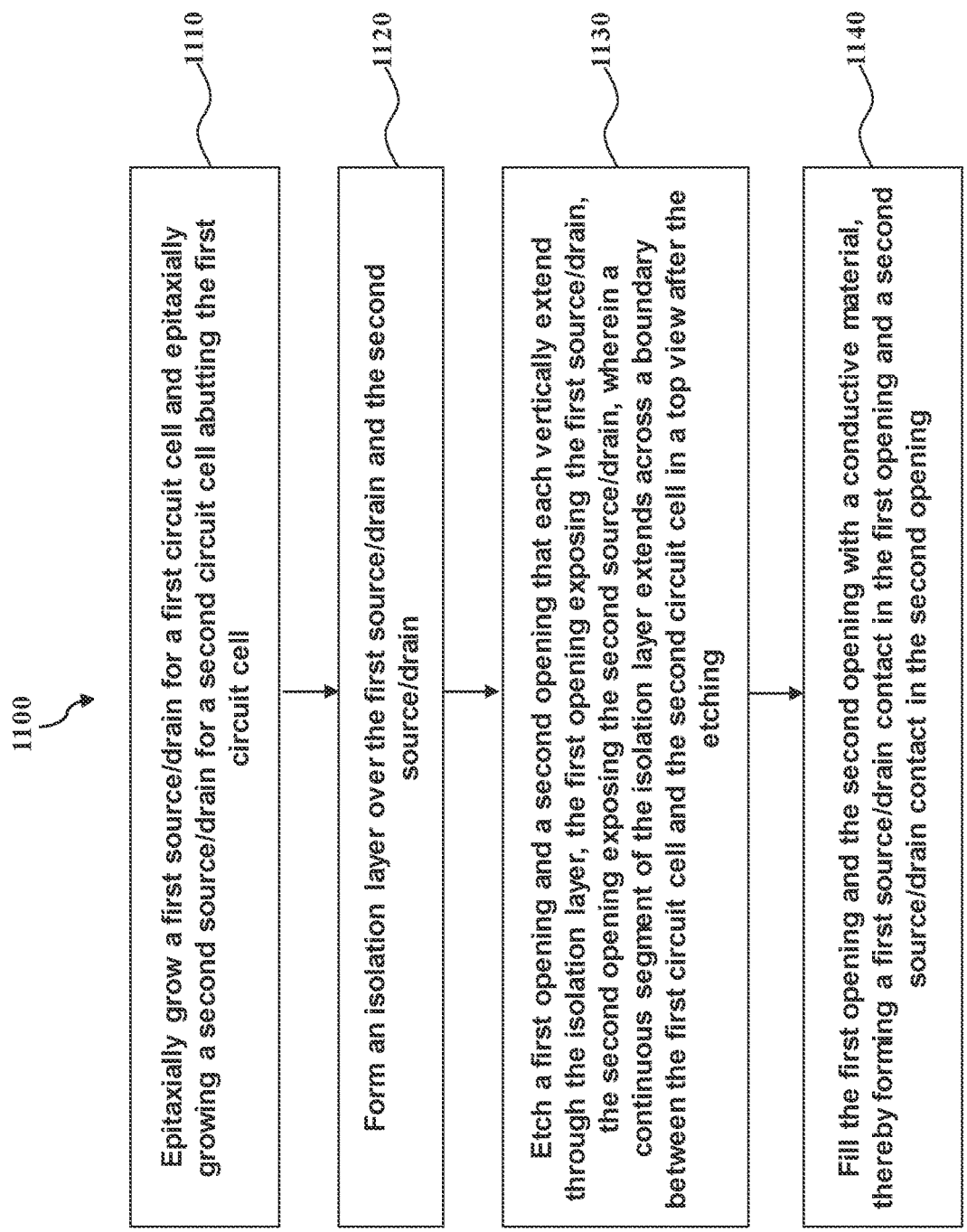

FIG. 17 is a flowchart illustrating a method 1100 of fabricating a semiconductor device according to embodiments of the present disclosure. The method 1100 includes a step 1110 to epitaxially grow a first source/drain for a first circuit cell and epitaxially grow a second source/drain for a second circuit cell abutting the first circuit cell.

The method 1100 includes a step 1120 to form an isolation layer over the first source/drain and the second source/drain.

The method 1100 includes a step 1130 to etch a first opening and a second opening that each vertically extend through the isolation layer, the first opening exposing the first source/drain, the second opening exposing the second source/drain. A continuous segment of the isolation layer extends across a boundary between the first circuit cell and the second circuit cell in a top view after the etching. In some embodiments, during the etching, no other opening is etched through the isolation layer between the first opening and the second opening.

The method 1100 includes a step 1140 to fill the first opening and the second opening with a conductive material, thereby forming a first source/drain contact in the first opening and a second source/drain contact in the second opening.

It is understood that the method 1100 may include further steps performed before, during, or after the steps 1110-1140. For example, the method 1100 may include a step of receiving a layout design file, wherein the layout design file specifies a third opening etched through the isolation layer between the first opening and the second opening, the third opening extending across the boundary between the first circuit cell and the second circuit cell in the top view. The method 1100 may further include a step of revising the layout design file at least in part by eliminating the third opening. The epitaxially growing, the forming the isolation layer, the etching, and the filling are performed according to the revised layout design file. Other additional steps may include forming dummy gate structures, epitaxially growing source/drain components, replacing the dummy gate structures with HKMG structures, forming additional metallization layers, etc. For reasons of simplicity, these additional steps are not discussed herein in detail.

The advanced lithography process, method, and materials described above can be used in many applications, including fin-type field effect transistors (FinFETs). For example, the fins may be patterned to produce a relatively close spacing between features, for which the above disclosure is well suited. In addition, spacers used in forming fins of FinFETs, also referred to as mandrels, can be processed according to the above disclosure. It is also understood that the various aspects of the present disclosure discussed above may apply to multi-channel devices such as Gate-All-Around (GAA) devices. To the extent that the present disclosure refers to a fin structure or FinFET devices, such discussions may apply equally to the GAA devices.

In summary, the present disclosure involves receiving an original IC layout design, in which the spacing between certain IC components belonging to abutted IC cells is too small. The present disclosure then modifies the received original IC layout design to generate a new layout design, where such a spacing is eliminated. This may be done by enlarging the IC components, or by implementing patches between the IC components to connect them together. The revised IC layout design is then used to manufacture actual IC devices.

The present disclosure may offer advantages over conventional devices. However, it is understood that not all advantages are discussed herein, different embodiments may offer different advantages, and that no particular advantage is required for any embodiment. One advantage is that defects in semiconductor fabrication may be reduced. In more detail, the small gaps between the IC components (e.g., between isolation segments located in power rail regions of abutted IC cells) according to the original IC layout design may lead to defects such as trapped air gaps or electrical shorting. By eliminating such gaps between the IC components across the boundary between abutted IC cells, IC devices fabricated according to the revised IC layout design will be substantially free of such defects. In addition, the elimination of such gaps means the elimination of a non-functional and undesirable metal component, which in turn translates into a reduction of parasitic capacitance, since such a non-functional metal component would have served as an electrode of a parasitic capacitor. Other advantages may include compatibility with existing fabrication processes (including for both FinFET and GAA processes) and the ease and low cost of implementation.

One aspect of the present disclosure pertains to a device. The device includes a first circuit cell that includes: a first active region; a first source/drain component disposed over the first active region; an isolation layer disposed over the first source/drain component; and a first source/drain contact extending vertically through the isolation layer and disposed directly over the first source/drain component. The device includes a second circuit cell that includes: a second active region; a second source/drain component disposed over the second active region; the isolation layer disposed over the second source/drain component; and a second source/drain contact extending vertically through the isolation layer and disposed directly over the second source/drain component. A continuous segment of the isolation layer spans across an interface between the first circuit cell and the second circuit cell.

Another aspect of the present disclosure pertains to a method. An integrated circuit (IC) layout design is received that includes a first circuit cell and a second circuit cell abutted to one another. The first circuit cell contains a first IC component, and the second circuit cell contains a second IC component. A determination is made that a distance between the first IC component and the second IC component is less than a predefined threshold when the first circuit cell and the second circuit cell are abutted together. The IC layout design is revised such that the distance between the first IC component and the second IC component is eliminated in the revised IC layout design.

Yet another aspect of the present disclosure pertains to a method. A first source/drain for a first circuit cell is epitaxially grown, and a second source/drain for a second circuit cell abutting the first circuit cell is epitaxially grown. An isolation layer is formed over the first source/drain and the second source/drain. A first opening and a second opening are etched that each vertically extend through the isolation layer. The first opening exposes the first source/drain, and the second opening exposes the second source/drain. A continuous segment of the isolation layer extends across a boundary between the first circuit cell and the second circuit cell in a top view after the etching. The first opening and the second opening are filled with a conductive material, thereby forming a first source/drain contact in the first opening and a second source/drain contact in the second opening.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:
1. A device, comprising:
   a first circuit cell that includes:
   a first active region;
   a first source/drain component disposed over the first active region;
   a first source/drain contact disposed over the first source/drain component; and a first isolation layer disposed on a side surface of the first source/drain contact in a cross-sectional side view; and a second circuit cell that includes:
a second active region;
a second source/drain component disposed over the second active region;
a second source/drain contact disposed over the second source/drain component; and
a second isolation layer disposed on a side surface of the second source/drain contact in the cross-sectional side view; and wherein the first isolation layer is contiguous with the second isolation layer in the cross-sectional side view, and wherein the first isolation layer and the first source/drain contact have co-planar bottom surfaces in the cross-sectional side view, and wherein the second isolation layer and the second source/drain contact have co-planar bottom surfaces in the cross-sectional side view.

2. The device of claim 1, wherein:
the first circuit cell includes a first power rail region;
the second circuit cell includes a second power rail region;
the first power rail region is continuous with the second power rail region; and
the first isolation layer and the second isolation layer collectively span across both the first power rail region and the second power rail region.

3. The device of claim 1, wherein
the first active region and the second active region each extends in a first direction in a top view;
the first active region and the second active region are separated from each other in a second direction in the top view; and
the first isolation layer and the second isolation layer collectively extend into both the first circuit cell and the second circuit cell in the second direction in the top view.

4. The device of claim 1, wherein:
the first active region and the second active region each extends in a first direction in a top view;
the first active region and the second active region are separated from each other in a second direction in the top view; and
the first isolation layer and the second isolation layer collectively extend into both the first circuit cell and the second circuit cell in a third direction between the first direction and the second direction in the top view.

5. The device of claim 1, wherein:
the first active region and the second active region each extends in a first direction in a top view;
the first isolation layer or the second isolation layer has a first dimension measured in a second direction perpendicular to the first direction;
the device further includes a third isolation layer having a second dimension measured in the second direction; and
the first dimension is larger than the second dimension.

6. The device of claim 1, further comprising an interlayer dielectric (ILD) that laterally surrounds the first source/drain component and the second source/drain component in the cross-sectional side view, wherein the bottom surfaces of the first isolation layer and the second isolation layer extend to a top surface of the ILD.

7. A device, comprising:
a first circuit cell that includes:

a first active region;
a first source/drain component disposed over the first active region;
an isolation layer disposed over the first source/drain component; and
a first source/drain contact extending vertically through the isolation layer and disposed directly over the first source/drain component; and a second circuit cell that includes:
a second active region;
a second source/drain component disposed over the second active region;
the isolation layer disposed over the second source/drain component; and
a second source/drain contact extending vertically through the isolation layer and disposed directly over the second source/drain component;

wherein a continuous segment of the isolation layer spans across an interface between the first circuit cell and the second circuit cell, and wherein the isolation layer, the first source/drain contact, and the second source/drain contact have co-planar bottom surfaces in a cross-sectional side view.

8. The device of claim 7, wherein the continuous segment is disposed directly between the first source/drain component and the second source/drain component.

9. The device of claim 7, wherein:
the first circuit cell includes a first power rail region;
the second circuit cell includes a second power rail region;
the first power rail region is directly abutted to the second power rail region; and
the continuous segment of the isolation layer is located in both the first power rail region and the second power rail region.

10. The device of claim 7, wherein:
the first active region and the second active region each extends in a first direction in a top view;
the first active region and the second active region are separated from each other in a second direction in the top view; and
the continuous segment spans across the interface in the second direction in the top view.

11. The device of claim 7, wherein:
the first active region and the second active region each extends in a first direction in a top view;
the first active region and the second active region are separated from each other in a second direction in the top view; and
the continuous segment spans across the interface in a third direction between the first direction and the second direction in the top view.

12. The device of claim 7, wherein:
the first active region and the second active region each extends in a first direction in a top view;
the continuous segment is a first segment of the isolation layer has a first dimension measured in a second direction perpendicular to the first direction;
the isolation layer further includes a second segment disposed directly adjacent to the first segment;
the second segment has a second dimension measured in the second direction; and
the first dimension is more than two times greater than the second dimension.

13. The device of claim 7, wherein:
the first circuit cell or the second circuit cell further includes a source/drain via;

the first active region and the second active region each extends in a first direction in a top view;

the first active region and the second active region are separated from each other in a second direction in the top view; and the source/drain via is located adjacent to the isolation layer in the first direction in the top view.

14. The device of claim 7, wherein the first circuit cell and the second circuit cell are circuit cells of a static random access memory (SRAM) device.

15. A device, comprising:

a first circuit cell that includes:
- a plurality of first active regions that each extend in a first direction in a top view, wherein the first active regions are spaced apart from one another in a second direction in the top view;
- a first source/drain contact disposed over one of the first active regions in a cross-sectional side view;
- a first power rail region that extends in the first direction in the top view; and
- a first portion of an isolation structure located in the first power rail region in the top view;

a second circuit cell that includes:
- a plurality of second active regions that each extend in the first direction in the top view, wherein the second active regions are spaced apart from one another in the second direction in the top view;
- a second source/drain contact disposed over one of the second active regions in the cross-sectional side view;
- a second power rail region that extends in the first direction in the top view; and
- a second portion of the isolation structure located in the second power rail region in the top view;

wherein:

the first power rail region and the second power rail region form an interface that extends in the first direction in the top view;

the first portion of the isolation structure extends to the second portion of the isolation structure in the top view;

the first portion of the isolation structure and the second portion of the isolation structure have different shapes in the top view; and the first portion and the second portion of the isolation structure have co-planar bottommost surfaces with the first source/drain contact and the second source/drain contact in the cross-sectional side view.

16. The device of claim 15, wherein the first circuit cell and the second circuit cell are circuit cells of a static random access memory (SRAM) device.

17. The device of claim 15, wherein:

the first portion of the isolation structure is a single continuous structure; and the second portion of the isolation structure includes a first segment and a second segment spaced apart from the first segment in the first direction in the top view.

18. The device of claim 17, wherein the first portion of the isolation structure has non-uniform dimensions measured in the second direction in the top view.

19. The device of claim 17, wherein the second circuit cell further includes a source/drain via that is disposed between the first segment and the second segment of the second portion of the isolation structure in the top view.

20. The device of claim 19, wherein the second portion of the isolation structure includes a first sub-portion and a second sub-portion that is separated from the first sub-portion, and wherein the first sub-portion and the second sub-portion have different shapes in the top view.

* * * * *